(12) United States Patent
Wang et al.

(10) Patent No.: US 11,302,472 B2
(45) Date of Patent: Apr. 12, 2022

(54) APPLIED MAGNETIC FIELD SYNTHESIS AND PROCESSING OF IRON NITRIDE MAGNETIC MATERIALS

(71) Applicant: REGENTS OF THE UNIVERSITY OF MINNESOTA, Minneapolis, MN (US)

(72) Inventors: Jian-Ping Wang, Shoreview, MN (US); Yanfeng Jiang, Minneapolis, MN (US)

(73) Assignee: REGENTS OF THE UNIVERSITY OF MINNESOTA, Minneapolis, MN (US)

(*) Notice: Subject to any disclaimer, the term of this patent is extended or adjusted under 35 U.S.C. 154(b) by 1129 days.

(21) Appl. No.: 15/546,407

(22) PCT Filed: Jul. 22, 2015

(86) PCT No.: PCT/US2015/041532
§ 371 (c)(1),
(2) Date: Jul. 26, 2017

(87) PCT Pub. No.: WO2016/122712
PCT Pub. Date: Aug. 4, 2016

(65) Prior Publication Data
US 2018/0025841 A1    Jan. 25, 2018

Related U.S. Application Data

(60) Provisional application No. 62/107,700, filed on Jan. 26, 2015.

(51) Int. Cl.
*H01F 41/02* (2006.01)
*H01F 1/047* (2006.01)
(Continued)

(52) U.S. Cl.
CPC ......... *H01F 41/0273* (2013.01); *B22D 27/02* (2013.01); *C22C 38/001* (2013.01);
(Continued)

(58) Field of Classification Search
CPC .... H01F 41/0266; H01F 41/0273; H01F 1/06; H01F 1/08; H01F 1/086; H01F 1/047; H01F 1/02; B22D 27/02
See application file for complete search history.

(56) References Cited

U.S. PATENT DOCUMENTS 10,504,640 B2 * 12/2019 Wang .................. B22F 9/04
2011/0074531 A1    3/2011 Yamashita et al.
(Continued)

FOREIGN PATENT DOCUMENTS

JP    2005-136015 A    5/2005
JP    2009-074150 A    4/2009
(Continued)

OTHER PUBLICATIONS

International Search Report from PCT/US2015/041532 as prepared by the ISA/KR; dated Oct. 30, 2015.
(Continued)

*Primary Examiner* — Livius R. Cazan
(74) *Attorney, Agent, or Firm* — BakerHostetler

(57) ABSTRACT

Techniques are disclosed concerning applied magnetic field synthesis and processing of iron nitride magnetic materials. Some methods concern casting a material including iron in the presence of an applied magnetic field to form a workpiece including at least one ironbased phase domain including uniaxial magnetic anisotropy, wherein the applied magnetic field has a strength of at least about 0.01 Tesla (T). Also disclosed are workpieces made by such methods, apparatus for making such workpieces and bulk materials made by such methods.

32 Claims, 8 Drawing Sheets

12 — FORM MOLTEN MIXTURE INCLUDING IRON AND NITROGEN

14 — CAST MATERIAL IN PRESENCE OF EXTERNAL MAGNETIC FIELD

(51) Int. Cl.
*H01F 1/08* (2006.01)
*B22D 27/02* (2006.01)
*C22C 38/00* (2006.01)
*H01F 1/06* (2006.01)
*H02K 1/02* (2006.01)

(52) U.S. Cl.
CPC .............. *H01F 1/047* (2013.01); *H01F 1/06* (2013.01); *H01F 1/08* (2013.01); *H01F 41/0266* (2013.01); *H02K 1/02* (2013.01)

(56) References Cited

U.S. PATENT DOCUMENTS

| | | | |
|---|---|---|---|
| 2013/0140076 A1 | 6/2013 | Lee et al. | |
| 2013/0257573 A1* | 10/2013 | Takahashi | H01F 1/065 335/302 |
| 2014/0159842 A1* | 6/2014 | Fukuzaki | H01F 41/0273 335/302 |

FOREIGN PATENT DOCUMENTS

| | | |
|---|---|---|
| JP | 2009-259402 A | 11/2009 |
| JP | 2012-069811 A | 4/2012 |
| JP | 2012-253248 A | 12/2012 |
| JP | 2012253248 A * | 12/2012 |
| JP | 2014-529682 A | 11/2014 |
| WO | 2012159096 A2 | 11/2012 |
| WO | 2013/026007 A2 | 2/2013 |
| WO | 2014/124135 A2 | 8/2014 |
| WO | 2014/210027 A1 | 12/2014 |

OTHER PUBLICATIONS

Y-C. Shih, "Lawrence Berkeley National Laboratory Recent Work Title The Observation of the habit plane shift and the morphology of a", Nitride (Fe16N2) Precipitate in a-Fe, Jun. 1, 1982, figure 6.
Watanabe Y. et al., "Effect of magnetic fields on the formation of Fe"1"6N"2 Precipitates in Fe@?N alloys", Materials Science and Engineering: A, Elsevier, Amsterdam, NL, Oct. 25, 1991, vol. 146, No. 1-2, pp. 151-160.
U.S. Appl. No. 62/019,046, filed Jun. 30, 2014, entitled Applied Magnetic Field Synthesis and Processing of Iron Nitride Magnetic Materials.
Migaku Takahashi et al., "Magentic Moment of—FE16N2 Films (Invited)", Journal of Applied Physics, American Institute of Physics, US, Nov. 15, 1994, vol. 76, No. 10, part 02, pp. 6642-6647.
Jiang Yanfeng et al., "9 T high magnetic field annealing effects on FeN bulk sample", Journal of Applied Physics, American Institute of Physics, US, May 7, 2014, vol. 115, No. 17, pp. 17A758-1 _ 17A758-3.
Coey et al., Magnetic nitrides, Journal of Magnetism and Magnetic Materials, Oct. 1999, vol. 200, Issues 1-3, pp. 405-424.

* cited by examiner

APPLIED MAGNETIC FIELD SYNTHESIS AND PROCESSING OF IRON NITRIDE MAGNETIC MATERIALS

CROSS-REFERENCE TO RELATED APPLICATIONS

This application is a National Stage of International Patent Application No. PCT/US2015/041532, filed Jul. 22, 2015, and claims the benefit of U.S. Provisional Patent Application No. 62/107,700, filed Jan. 26, 2015, and both applications titled "APPLIED MAGNETIC FIELD SYNTHESIS AND PROCESSING OF IRON NITRIDE MAGNETIC MATERIALS," the entire contents of which is are incorporated by reference herein.

GOVERNMENT INTEREST IN INVENTION

This invention was made with Government support under contract number DE-AR0000199 awarded by DOE, Office of ARPA-E. The government has certain rights in this invention.

TECHNICAL FIELD

The disclosure relates to techniques for forming iron nitride magnetic materials.

BACKGROUND

Permanent magnets play a role in many electromechanical systems, including, for example, alternative energy systems. For example, permanent magnets are used in sensors, actuators, electric motors or generators, which may be used in vehicles, wind turbines, and other alternative energy mechanisms. Many permanent magnets in current use include rare earth elements, such as neodymium, which result in high energy product. These rare earth elements are in relatively short supply, and may face increased prices and/or supply shortages in the future. Additionally, some permanent magnets that include rare earth elements are expensive to produce. For example, fabrication of NdFeB and ferrite magnets generally includes crushing material, compressing the material, and sintering at temperatures over 1000° C., all of which contribute to high manufacturing costs of the magnets. Additionally, the mining of rare earth can lead to severe environmental deterioration.

SUMMARY

The present disclosure describes techniques for forming magnetic materials including at least one iron-based phase domain including uniaxial magnetic anisotropy. For example, an iron-based phase domain including uniaxial magnetic anisotropy may include iron having a body centered-tetragonal crystalline structure, $\alpha''\text{-Fe}_{16}\text{N}_2$, $\alpha''\text{-Fe}_{16}\text{C}_2$, Fe, or other Fe-based magnetic materials. The techniques described herein may include at least one of casting a mixture of iron and nitrogen in an applied magnetic field or consolidating a plurality of workpieces, at least some of which include at least one iron-based phase domain including uniaxial magnetic anisotropy, while exposing the plurality of workpieces to an applied magnetic field.

During a casting technique, iron nitride crystals may nucleate and grow from a molten mixture including iron and nitrogen. By applying a magnetic field during the casting process, the nucleation and grown of iron nitride crystals may be influenced such that growth of crystals having a predetermined orientation may be energetically favorable. For example, iron nitride crystals having (002) or (004) crystal planes substantially parallel (e.g., parallel or nearly parallel (such as within about 5 degrees from parallel)) to the direction of the applied magnetic field may be more energetically favorable than iron nitride crystals with a different orientation (e.g., with a (110), (112), (202), or (200) crystal plane substantially parallel (e.g., parallel or nearly parallel (such as within about 5 degrees from parallel)) to the direction of the applied magnetic field). Thus, the applied field may increase the likelihood that some or all iron nitride crystals of a plurality of iron nitride crystals may have a similar crystal orientation. A material with multiple iron nitride crystals with a substantially similar crystal orientation may increase magnetic anisotropy of the material.

During a consolidation, a magnetic field may be applied to the material being consolidated to substantially align (e.g., align or nearly align (such as within about 5 degrees from perfect alignment)) magnetic easy axes of multiple workpieces including at least one iron-based phase domain including uniaxial magnetic anisotropy, such as $\alpha''\text{-Fe}_{16}\text{N}_2$. The magnetic easy axis is the direction of the iron-based phase domain crystal cell along which alignment of the magnetic moment is energetically favorable and metastable. In some examples, the magnetic easy axis of an iron-based phase domain including uniaxial magnetic anisotropy unit cell is the <001> or c-axis. In some examples, the multiple workpieces may include powder, particulates, ribbons, sheets, wires, or other geometric shapes. By applying the magnetic field during the compaction process, magnetic easy axes of multiple workpieces including at least one iron-based phase domain including uniaxial magnetic anisotropy may be aligned substantially parallel (e.g., parallel or nearly parallel (such as within about 5 degrees from parallel)) to the direction of the applied magnetic field. This may help define the magnetization direction of the consolidated magnetic material, and also may increase magnetic anisotropy of the consolidated magnetic material.

In some examples, the disclosure describes a method including casting a material including iron in the presence of an applied magnetic field to form a workpiece including at least one iron-based phase domain including uniaxial magnetic anisotropy, wherein the applied magnetic field has a strength of at least about 0.01 Tesla (T).

In some examples, the disclosure describes a method including compacting a plurality of workpieces, each workpiece including at least one iron-based phase domain including uniaxial magnetic anisotropy, in the presence of an applied magnetic field to form a bulk material including a plurality of iron-based phase domains including uniaxial magnetic anisotropy, wherein the applied magnetic field has a strength of at least about 0.01 Tesla (T), wherein the applied magnetic field defines the magnetization direction of the bulk material.

In some examples, the disclosure describes an apparatus configured to perform any of the techniques described herein.

In some examples, the disclosure describes a workpiece formed by any of the techniques described herein.

In some examples, the disclosure describes a bulk material formed by any of the techniques described herein.

In some examples, the disclosure describes a method including casting a material including at least one of nickel, iron and cobalt in the presence of an applied magnetic field to form a workpiece including at least one nickel, iron or cobalt-based phase domain including uniaxial magnetic anisotropy, wherein the applied magnetic field has a strength of at least about 0.01 Tesla (T).

In some examples, the disclosure describes a workpiece including at least one anisotropically-shaped iron-based grain, where the at least one anisotropically-shaped iron-based grain comprises an aspect ratio of between about 1.1 and about 50, and where the aspect ratio is defined as the ratio of the length of a longest dimension to the length of a shortest dimension of the anisotropic grain. The longest dimension and shortest dimension may be substantially orthogonal.

In some examples, the disclosure describes a bulk permanent magnet including at least one anisotropically-shaped iron-based grain, where the at least one anisotropically-shaped iron-based grain comprises an aspect ratio of between about 1.1 and about 50, and where the aspect ratio is defined as the ratio of the length of a longest dimension to the length of a shortest dimension of the anisotropic grain. The longest dimension and shortest dimension may be substantially orthogonal.

The details of one or more examples are set forth in the accompanying drawings and the description below. Other features, objects, and advantages will be apparent from the description and drawings, and from the claims.

DETAILED DESCRIPTION

Figure 1:
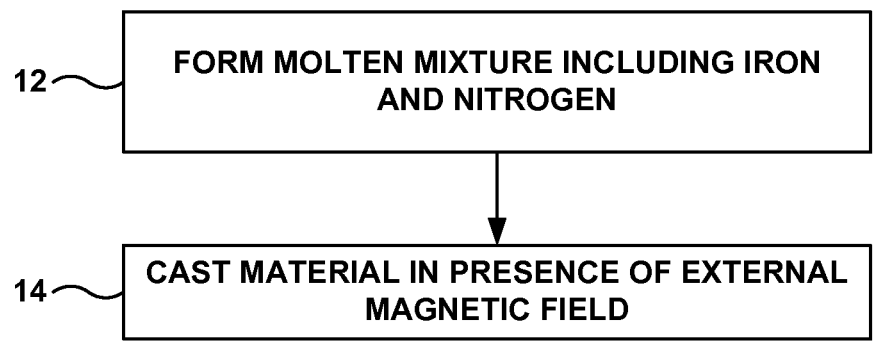
FIG. 1 is a flow diagram illustrating an example technique for casting a material including iron and nitrogen in the presence in an applied magnetic field.

The present disclosure may be understood more readily by reference to the following detailed description taken in connection with the accompanying figures and examples, which form a part of this disclosure. It is to be understood that this disclosure is not limited to the specific devices, methods, applications, conditions, or parameters described and/or shown herein, and that the terminology used herein is for the purpose of describing particular examples and is not intended to be limiting of the claims. When a range of values is expressed, another example includes from the one particular value and/or to the other particular value. Similarly, when values are expressed as approximations, by use of the antecedent "about," it will be understood that the particular value forms another example. All ranges are inclusive and combinable. Further, a reference to values stated in a range includes each and every value within that range.

It is to be appreciated that certain features of the disclosure which are, for clarity, described herein in the context of separate examples, may also be provided in combination in a single example. Conversely, various features of the disclosure that are, for brevity, described in the context of a single example, may also be provided separately or in any subcombination.

The disclosure describes magnetic materials including at least one iron-based phase domain including uniaxial magnetic anisotropy, bulk permanent magnets including at least one iron-based phase domain including uniaxial magnetic anisotropy, techniques for forming magnetic materials including at least one iron-based phase domain including uniaxial magnetic anisotropy, and techniques for forming bulk permanent magnets including at least one iron-based phase domain including uniaxial magnetic anisotropy. Bulk permanent magnets including at least one iron-based phase domain including uniaxial magnetic anisotropy may provide an alternative to permanent magnets that include a rare earth element, because iron-based phase domains including uniaxial magnetic anisotropy may have high saturation magnetization, high magnetic anisotropy constant, and, therefore high, energy product. An example iron-based compound that includes uniaxial magnetic anisotropy is $\alpha''\text{-Fe}_{16}N_2$. Other example iron-based compounds may include those that have a body-centered tetragonal crystalline structure, such as strained iron, or some compounds including iron and at least one of N, C, B, O, P, Y, Mn, Co, Cr, Si, Al, Zn, or the like.

$\alpha''\text{-Fe}_{16}N_2$ has high saturation magnetization, high magnetic anisotropy constant, and, therefore high, energy product. The high saturation magnetization and magnetic anisotropy constants result in a magnetic energy product that may be higher than rare earth magnets in some examples. Bulk $\alpha''\text{-Fe}_{16}N_2$ permanent magnets made according to the techniques described herein may have desirable magnetic properties, including an energy product of as high as about 130 MGOe when the $\alpha''\text{-Fe}_{16}N_2$ permanent magnet is anisotropic. In examples in which the $\alpha''\text{-Fe}_{16}N_2$ magnet is isotropic, the energy product may be as high as about 33.5 MGOe. The energy product of a permanent magnetic is proportional to the product of remanent coercivity and remanent magnetization. For comparison, the energy product of $Nd_2Fe_{14}B$ permanent magnet may be as high as about 60 MGOe. A higher energy product can lead to increased efficiency of the permanent magnet when used in sensors, actuators, motors, generators, or the like. Additionally, permanent magnets that include a $Fe_{16}N_2$ phase may not include rare earth elements, which may reduce a materials cost of the magnet and may reduce an environmental impact of producing the magnet.

Without being limited by any theory of operation, it is believed that $\alpha''\text{-Fe}_{16}N_2$ is a metastable phase, which competes with other stable phases of iron nitride. Hence, forming bulk magnetic materials and bulk permanent magnets including α"-$Fe_{16}N_2$ phase domains may be difficult. Various techniques described herein may facilitate formation of magnetic materials including $Fe_{16}N_2$ iron nitride phase domains. In some examples, the techniques may reduce a cost of forming magnetic materials including α"-$Fe_{16}N_2$ iron nitride phase domains, increase a volume fraction of α"-$Fe_{16}N_2$ iron nitride phase domains in the magnetic material, provide greater stability of the α"-$Fe_{16}N_2$ iron nitride phase domains within the magnetic material, facilitate mass production of magnetic materials including $Fe_{16}N_2$ iron nitride phase domains, and/or improve magnetic properties of the magnetic materials including $Fe_{16}N_2$ iron nitride phase domains compared to other techniques for forming magnetic materials including $Fe_{16}N_2$ iron nitride phase domains.

The bulk permanent magnets described herein including at least one iron-based phase domain including uniaxial magnetic anisotropy, such as α"-$Fe_{16}N_2$, may possess anisotropic magnetic properties. Such anisotropic magnetic properties are characterized as having a different energy product, coercivity and magnetization moment at different relative orientations to an applied electric or magnetic field. Accordingly, the disclosed bulk iron nitride magnets may be used in any of a variety of applications (e.g., electric motors) to impart into such applications low energy loss and high energy efficiency.

The present disclosure describes techniques for forming magnetic materials including at least one iron-based phase domain including uniaxial magnetic anisotropy, such as at least one α"-$Fe_{16}N_2$ phase domain. The techniques described herein may include at least one of casting a mixture of iron and nitrogen in an applied magnetic field or consolidating a plurality of workpieces, at least some of which include at least one iron-based phase domain including uniaxial magnetic anisotropy, such as at least one α"-$Fe_{16}N_2$ phase domain, while exposing the plurality of workpieces to an applied magnetic field.

During a casting technique, iron nitride crystals may nucleate and grow from a molten mixture including iron and nitrogen. By applying a magnetic field during the casting process, the nucleation and grown of iron nitride crystals may be influenced such that growth of crystals having a predetermined orientation may be energetically favorable. For example, iron nitride crystals having (002) or (004) crystal planes substantially parallel (e.g., parallel or nearly parallel (such as within about 5 degrees from parallel)) to the direction of the applied magnetic field may be more energetically favorable than iron nitride crystals with a different orientation (e.g., with a (110), (112), (202), or (200) crystal plane substantially parallel (e.g., parallel or nearly parallel (such as within about 5 degrees from parallel)) to the direction of the applied magnetic field. Thus, the applied field may increase the likelihood that some or all iron nitride crystals of a plurality of iron nitride crystals may have a similar crystal orientation. A material with multiple iron nitride crystals with a substantially similar crystal orientation may increase magnetic anisotropy of the material.

In some examples, in addition to possessing uniaxial magnetic anisotropy, the casting technique may form at least one iron nitride crystal or grain that defines an anisotropic shape. The at least one anisotropically-shaped iron nitride crystal or grain may define an aspect ratio of between about 1.1 and about 50, such as between about 1.4 and about 50, or between 2.2 and about 50, or between about 5 and about 50. As used herein, aspect ratio is defined as the ratio of the length of a longest dimension to the length of a shortest dimension of the anisotropic grain, where shortest dimension is measured in a direction substantially orthogonal (e.g., orthogonal or nearly orthogonal (such as within about 5 degrees from orthogonal)) to the longest dimension. In some examples, the longest dimension of the at least one anisotropically-shaped iron nitride crystal or grain may be substantially parallel (e.g., parallel or nearly parallel (such as within about 5 degrees from parallel)) to the direction of the applied magnetic field, and thus, to the direction of the uniaxial magnetic anisotropy. Similarly, the longest dimension of the at least one anisotropically-shaped iron nitride crystal or grain may be substantially parallel (e.g., parallel or nearly parallel (such as within about 5 degrees from parallel)) to the easy axis of the magnetocrystalline anisotropy of the anisotropically-shaped iron nitride crystal or grain. For example, for body centered tetragonal (bct) $Fe_{16}N_2$ and Fe, (002) texture may be substantially parallel (e.g., parallel or nearly parallel (such as within about 5 degrees from parallel)) to the longest dimension of the crystal or grain. In this way, the shape anisotropy possessed by the anisotropically-shaped iron nitride crystal or grain may contribute to the magnetic anisotropy of the material. In other examples, for bc) $Fe_{16}N_2$, (002) texture may be substantially parallel (e.g., parallel or nearly parallel (such as within about 5 degrees from parallel)) to the shortest dimension of the crystal or grain.

During a consolidation, a magnetic field may be applied to the material being consolidated to substantially align (e.g., align or nearly align (such as within about 5 degrees from aligned)) magnetic easy axes of multiple workpieces including at least one iron-based phase domain including uniaxial magnetic anisotropy, such as at least one α"-$Fe_{16}N_2$ phase domain. The magnetic easy axis is the direction of the crystal cell along which alignment of the magnetic moment is energetically favorable and metastable. In some examples, the magnetic easy axis of a unit cell of an iron-based phase domain including uniaxial magnetic anisotropy is the <001> or c-axis. In some examples, the multiple workpieces may include powder, particulates, ribbons, sheets, wires, or other geometric shapes. By applying the magnetic field during the compaction process, magnetic easy axes of multiple workpieces including at least one iron-based phase domain including uniaxial magnetic anisotropy α"-$Fe_{16}N_2$ phase domain may be aligned substantially parallel (e.g., parallel or nearly parallel (such as within about 5 degrees from parallel)) to the direction of the applied magnetic field. This may help define the magnetization direction of the consolidated magnetic material, and also may increase magnetic anisotropy of the consolidated magnetic material.

In some examples, the casting and consolidation techniques may be used together as part of a larger technique for forming a bulk magnetic material including at least one iron-based phase domain including uniaxial magnetic anisotropy α"-$Fe_{16}N_2$ phase domain. In some examples, the larger technique may include additional steps including, for example, quenching the casted magnetic material, annealing the quenched magnetic material, or the like. In some examples, an external magnetic field may be applied during at least some of these other steps to facilitate formation of at least one iron-based phase domain including uniaxial magnetic anisotropy α"-$Fe_{16}N_2$ phase domain. For example, a magnetic field may be applied during an annealing step to facilitate formation of at least one iron-based phase domain including uniaxial magnetic anisotropy α"-$Fe_{16}N_2$ phase domain in the material. Although the following description will primarily describe iron nitride materials, including α"-$Fe_{16}N_2$, one of ordinary skill in the art will recognize that the description may be adapted to other iron-based materials including uniaxial magnetic anisotropy, such as strained iron or an iron compound including at least one of N, C, B, O, P, Y, Mn, Co, Cr, Si, Al, Zn, or the like and a body-centered tetragonal crystalline structure.

FIG. 1 is a flow diagram illustrating an example technique for casting a material including iron and nitrogen in the presence in an applied magnetic field. The technique of FIG. 1 includes forming a molten mixture including iron and nitrogen (12). The molten mixture may be formed using any one of a number of techniques. For example, a solid material including iron and nitrogen may be formed first, followed by melting the solid material including iron and nitrogen to form a molten mixture including iron and nitrogen. As another example, molten iron may be mixed with a nitrogen source to form the molten mixture including iron and nitrogen.

An example technique for forming a solid material including iron and nitrogen includes nitridizing an iron-containing workpiece. The iron-containing workpiece may include, for example, powder, particulates, ribbons, sheets, wires, or other geometric shapes. In some examples, nitridizing the iron-containing workpiece may include heating the iron-containing workpiece to a temperature for a time sufficient to allow diffusion of nitrogen to a predetermined concentration substantially throughout the volume of the iron-containing workpiece. In this manner, the heating time and temperature are related, and may also be affected by the composition and/or geometry of the iron-containing workpiece. For example, iron wire or sheet 28 may be heated to a temperature between about 125° C. and about 600° C. for between about 2 hours and about 9 hours.

In addition to heating the iron-containing workpiece, nitridizing the iron-containing workpiece includes exposing the iron-containing workpiece to an atomic nitrogen substance, which diffuses into the iron-containing workpiece. In some examples, the atomic nitrogen substance may be supplied as diatomic nitrogen ($N_2$), which is then separated (cracked) into individual nitrogen atoms. In other examples, the atomic nitrogen may be provided from another atomic nitrogen precursor, such as ammonia ($NH_3$). In other examples, the atomic nitrogen may be provided from urea ($CO(NH_2)_2$). The nitrogen may be supplied in a gas phase alone (e.g., substantially pure ammonia or diatomic nitrogen gas) or as a mixture with a carrier gas. In some examples, the carrier gas is argon (Ar).

In some examples, nitridizing the iron-containing workpiece may include a urea diffusion process, in which urea is utilized as a nitrogen source (e.g., rather than diatomic nitrogen or ammonia). Urea (also referred to as carbamide) is an organic compound with the chemical formula $CO(NH_2)_2$. To nitridize the iron-containing workpiece, urea may heated, e.g., within a furnace with enclosing the iron-containing workpiece, to generate decomposed nitrogen atoms which may diffuse into the iron-containing workpiece. As will be described further below, the constitution of the resulting nitridized iron material may controlled to some extent by the temperature of the diffusion process as well as the ratio (e.g., the weight ratio) of the iron-containing workpiece to urea used for the process. Further details regarding these nitridizing processes (including urea diffusion) may be found in International Patent Application No. PCT/US12/51382, filed Aug. 17, 2012, the entire content of which is incorporated herein by reference.

As another example of forming a solid material including iron and nitrogen, nitrogen atoms may be generated using a plasma, such as an RF plasma or a DC plasma, from a nitrogen source, such as a gaseous nitrogen source. An iron-containing workpiece may be placed in a plasma environment, such as a plasma chamber, and nitrogen atoms generated by the plasma process may be implanted in the iron-containing workpiece and diffuse into the iron-containing workpiece.

As another example of forming a solid material including iron and nitrogen, nitrogen atoms may be implanted in an iron-containing workpiece using ion implantation. For example, the iron-containing workpiece may be a foil. The foil may define a thickness on the order of hundreds of nanometers to millimeters. In some examples, the foil may define a thickness between about 500 nanometers (nm) and about 1 millimeter (mm). The thickness of the foil may affect the parameters used for ion implantation and annealing of the foil, as will be described below. The thickness of the foil may be measured in a direction substantially normal (e.g., normal or nearly normal (such as within about 5 degrees from normal)) to a surface of the substrate to which the foil is attached.

The average depth to which the N+ ions are implanted in the iron-containing workpiece may depend upon the energy to which the N+ ions are accelerated. In general, the average implant depth of the N+ ions may increase with increasing implant energy.

The implant energy used to implant the N+ ions may be selected based at least in part on the thickness of the iron-containing workpiece. The implant energy also may be selected to implant the N+ ions without doing overly significant damage to the iron-containing workpiece, including the crystal lattice of the iron crystals in the iron-containing workpiece. For example, while higher implant energies may allow implantation of the N+ ions at a greater average depth, higher implant energies may increase the damage to the iron workpiece, including damaging the crystal lattice of the iron crystals and ablating some of the iron atoms due to the impact of the N+ ions. Hence, in some examples, the implant energy may be limited to be below about 180 keV. In some examples, the incident angle of implantation may be about zero degrees (e.g., substantially perpendicular (e.g., parallel or nearly perpendicular (such as within about 5 degrees from perpendicular)) to the surface of the iron workpiece). In other examples, the incident angle of implantation may be adjusted to reduce lattice damage. For example, the incident angle of implantation may be between about 3° and about 7° from perpendicular.

As an example, when the iron-containing workpiece defines a thickness of about 500 nm, an implant energy of about 100 keV may be used to implant the N+ ions in the iron-containing workpiece. An implant energy of about 100 keV may also be used to implant the N+ ions in iron-containing workpieces of other thicknesses. In other examples, a different implant energy may be used for iron-containing workpieces defining a thickness of about 500 nm, and the same or different implant energy may be used for iron-containing workpieces defining a thickness different than 500 nm.

Additionally, the fluency of N+ ions may be selected to implant a desired dose of N+ ions within the iron-containing workpiece. In some examples, the fluency of N+ ions may be selected to implant approximately stoichiometric number of N+ ions within the iron-containing workpiece. The stoichiometric ratio of iron to nitrogen in $Fe_{16}N_2$ is 8:1. Thus, the approximate number of iron atoms in the iron-containing workpiece may be determined, and a number of N+ ions equal to approximately ⅛ (12.5%) of the iron atoms may be implanted in the iron-containing workpiece, such as between about 8 at. % and about 15 at. %. For example, an iron-containing workpiece having measurements of about 1 cm by 1 cm by 500 nm may include about $4.23 \times 10^{18}$ iron atoms. Thus, to achieve a stoichiometric ratio of iron atoms to N+ ions in the iron-containing workpiece, about $5.28 \times 10^{17}$ N+ ions may be implanted in the sample.

The temperature of the iron-containing workpiece during the ion implantation also may be controlled. In some examples, the temperature of the iron-containing workpiece may be between about room temperature and about 500° C. Further details regarding ion implantation of N+ ions in an iron-containing workpiece may be found in International Application No. PCT/US14/15104, filed Feb. 6, 2014, the entire content of which is incorporated herein by reference.

Another example technique for forming a solid material including iron and nitrogen includes milling an iron-containing material, such as a powder, in the presence of a nitrogen source. The milling apparatus used to mill the iron-containing material may include a rolling mode, stirring mode, or vibration mode milling apparatus. The milling apparatus may include a bin that encloses the iron-containing material, the nitrogen source, and milling media.

The milling media may include, for example, milling spheres. The milling media may include a sufficiently hard material that, when contacting iron-containing material with sufficient force, will wear iron-containing material and cause particles of iron-containing material to, on average, have a smaller size. In some examples, the milling media may be formed of steel, stainless steel, or the like. In some examples, the material from which the milling media are formed may not chemically react with iron-containing material and/or the nitrogen source.

The iron-containing material may include any material containing iron, including atomic iron, iron oxide, iron chloride, or the like. In some examples, the iron-containing material may include substantially pure iron (e.g., iron with less than about 10 atomic percent (at. %) dopants or impurities). In some examples, the dopants or impurities may include oxygen or iron oxide.

The nitrogen source may include ammonium nitrate ($NH_4NO_3$) or an amide-containing material, such as a liquid amide or a solution containing an amide, or hydrazine or a solution containing hydrazine. Amides include a C—N—H bond and hydrazine includes an N—N bond Ammonium nitrate, amides and hydrazine may serve as a nitrogen donor for forming the powder including iron nitride. Example amides include carbamide (($NH_2$)$_2$CO; also referred to as urea), methanamide, benzamide, and acetamide, although any amide may be used. In some examples, amides may be derived from carboxylic acids by replacing the hydroxyl group of a carboxylic acid with an amine group. Amides of this type may be referred to as acid amides.

In some examples, the bin of the milling apparatus also may enclose a catalyst. The Catalyst may include, for example, cobalt (Co) particles and/or nickel (Ni) particles. The catalyst catalyzes the nitridizing of the iron-containing material. One possible conceptualized reaction pathway for nitriding iron using a Co catalyst is shown in Reactions 1-3, below. A similar reaction pathway may be followed when using Ni as the catalyst.

Reaction 1

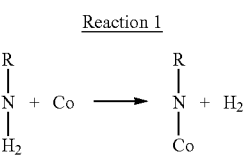

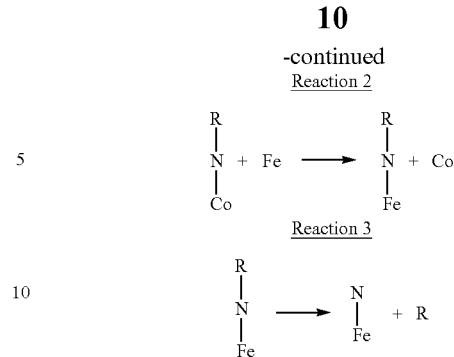

Hence, by mixing sufficient amide and catalyst 22, iron-containing raw material 18 may be converted to iron nitride containing material. Further details regarding milling an iron-containing material in the presence of a nitrogen source to form solid material including iron and nitrogen may be found in International Application No. PCT/US14/43902, filed Jun. 24, 2014, the entire content of which is incorporated herein by reference.

Regardless of the technique by which the solid material including iron and nitrogen is formed, the solid material including iron and nitrogen may include an approximately 8:1 iron-to-nitrogen atomic ratio. For example, the mixture may include between about 8 atomic percent (at. %) and about 15 at. % nitrogen, with a balance iron, other elements, and dopants. As another example, the mixture may include between about 10 at. % and about 13 at. % nitrogen, or about 11.1 at. % nitrogen.

In some examples, the mixture including iron and nitrogen may include at least one type of iron nitride, such as, for example, FeN, $Fe_2N$ (e.g., $\xi$-$Fe_2N$), $Fe_3N$ (e.g., $\varepsilon$-$Fe_3N$), $Fe_4N$ (e.g., $\gamma'$-$Fe_4N$ and/or $\gamma$-$Fe_4N$), $Fe_2N_6$, $Fe_8N$, $Fe_{16}N_2$, or $FeN_x$ (where x is between about 0.05 and about 0.5), in addition to iron and/or nitrogen. In some examples, the mixture including iron and nitrogen may have a purity (e.g., collective iron and nitrogen content) of at least 92 atomic percent (at. %).

In some examples, the mixture including iron and nitrogen may include at least one dopant, such as a ferromagnetic or nonmagnetic dopant and/or a phase stabilizer. In some examples, at least one ferromagnetic or nonmagnetic dopant may be referred to as a ferromagnetic or nonmagnetic impurity and/or the phase stabilizer may be referred to as a phase stabilization impurity. A ferromagnetic or nonmagnetic dopant may be used to increase at least one of the magnetic moment, magnetic coercivity, or thermal stability of the magnetic material formed from the mixture including iron and nitrogen. Examples of ferromagnetic or nonmagnetic dopants include Sc, Ti, V, Cr, Mn, Co, Ni, Cu, Zn, Zr, Nb, Mo, Ru, Rh, Pd, Ag, Cd, Ca, Pt, Au, Sm, C, Pb, W, Ga, Y, Mg, Hf, and Ta. For example, including Mn dopant atoms at levels between about 5 at. % and about 15 at. % in an iron nitride material including at least one $Fe_{16}N_2$ phase domain may improve thermal stability of the $Fe_{16}N_2$ phase domains and magnetic coercivity of the material compared to an iron nitride material not including Mn dopant atoms. In some examples, more than one (e.g., at least two) ferromagnetic or nonmagnetic dopants may be includes in the mixture including iron and nitrogen. In some examples, the ferromagnetic or nonmagnetic dopants may function as domain wall pinning sites, which may improve coercivity of the magnetic material formed from the mixture including iron and nitrogen. Table 1 includes example concentrations of ferromagnetic or nonmagnetic dopants within the mixture including iron and nitrogen.

TABLE 1

| Dopant | Concentration (at. %) |
|---|---|
| Sc | 0.1-33 |
| Ti | 0.1-28 |
| V | 0.1-25 |
| Nb | 0.1-27 |
| Cr | 0.1-10 |
| Mo | 0.1-3 |
| Mn | 0.1-28 |
| Ru | 2-28 |
| Co | 0.1-50 |
| Rh | 11-48 |
| Ni | 2-71 |
| Pd | 0.1-55 |
| Pt | 0.1-15 |
| Cu | 0.1-30 |
| Ag | 1-10 |
| Au | 1-10 |
| Zn | 0.1-30 |
| Cd | 0.1-35 |
| Zr | 0.1-33 |
| Pb | 0.1-60 |
| Mg | 0.1-60 |
| W | 0.1-20 |
| Ta | 0.1-20 |
| Ga | 0.1-10 |
| Sm | 0.1-11 |

Alternatively or additionally, the mixture including iron and nitrogen may include at least one phase stabilizer. The at least one phase stabilizer may be an element selected to improve at least one of $Fe_{16}N_2$ volume ratio, thermal stability, coercivity, and erosion resistance. When present in the mixture, the at least one phase stabilizer may be present in the mixture including iron and nitrogen at a concentration between about 0.1 at. % and about 15 at. %. In some examples in which at least two phase stabilizers at present in the mixture, the total concentration of the at least two phase stabilizers may be between about 0.1 at. % and about 15 at. %. The at least one phase stabilizer may include, for example, B, Al, C, Si, P, O, Co, Cr, Mn, and/or S. For example, including Mn dopant atoms at levels between about 5 at. % and about 15 at. % in an iron nitride material including at least one $Fe_{16}N_2$ phase domain may improve thermal stability of the $Fe_{16}N_2$ phase domains and magnetic coercivity of the material compared to an iron nitride material not including Mn dopant atoms.

Alternatively, instead of forming a solid material including iron and nitrogen, a nitrogen source may be mixed with molten iron to form the molten mixture including iron and nitrogen. Further details regarding mixing a nitrogen source with molten iron are illustrated and described below with respect to FIG. 5.

In some examples, instead of forming a molten material including iron and nitrogen (12), the technique of FIG. 1 may include forming a molten material including only iron, or iron and at least one of N, C, B, O, P, Y, Mn, Co, Cr, Si, Al, Zn, or the like in a relative proportion such that at least some of the material forms a body-centered tetragonal crystalline structure upon casting.

Figure 2:
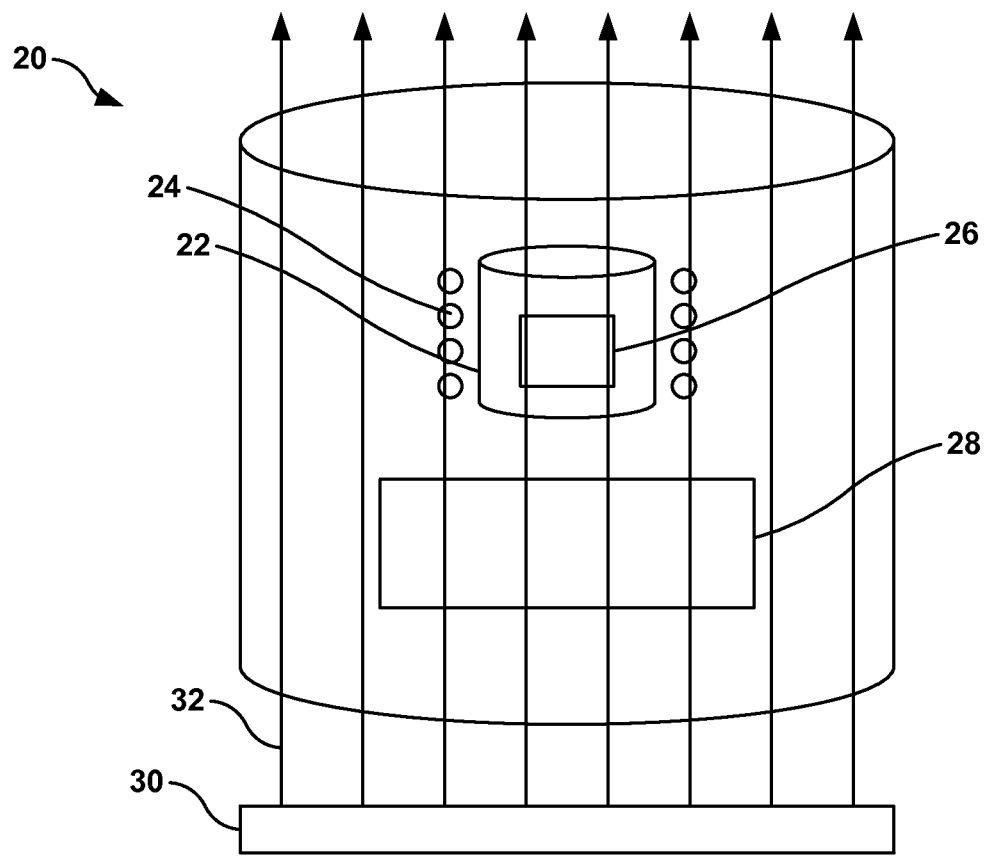
FIG. 2 is a conceptual diagram illustrating an example system that utilizes an RF furnace, a crucible, and an optional quenching medium to performing a casting technique on a mixture including iron and nitrogen.
Figure 3:
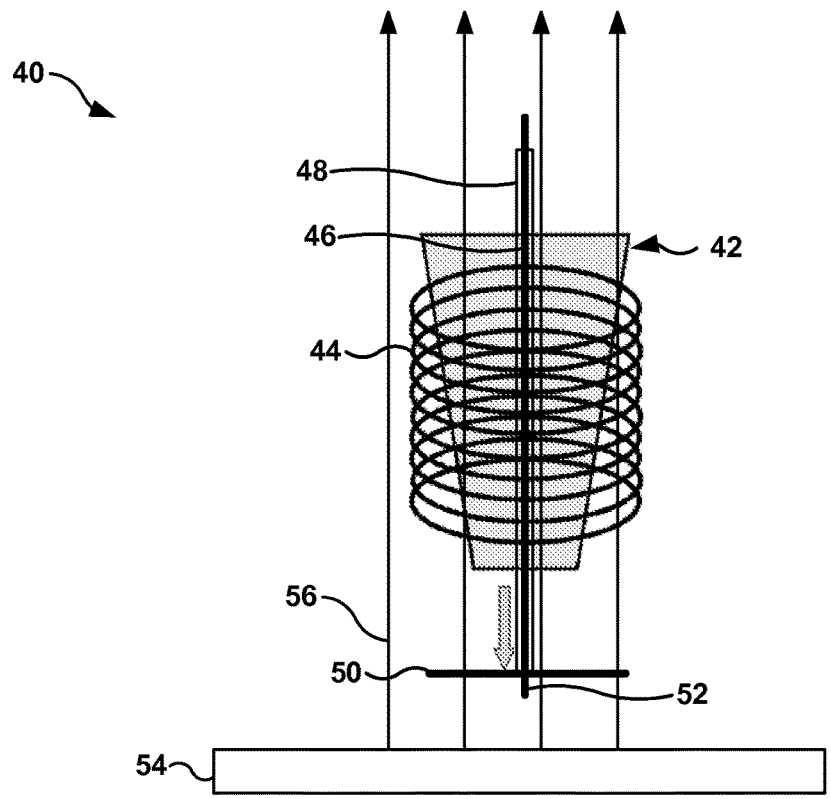
FIG. 3 is a conceptual diagram illustrating an example system that includes a crucible heating stage that may be used to cast a material including iron and nitrogen in the presence of an external magnetic field.
Figure 4:
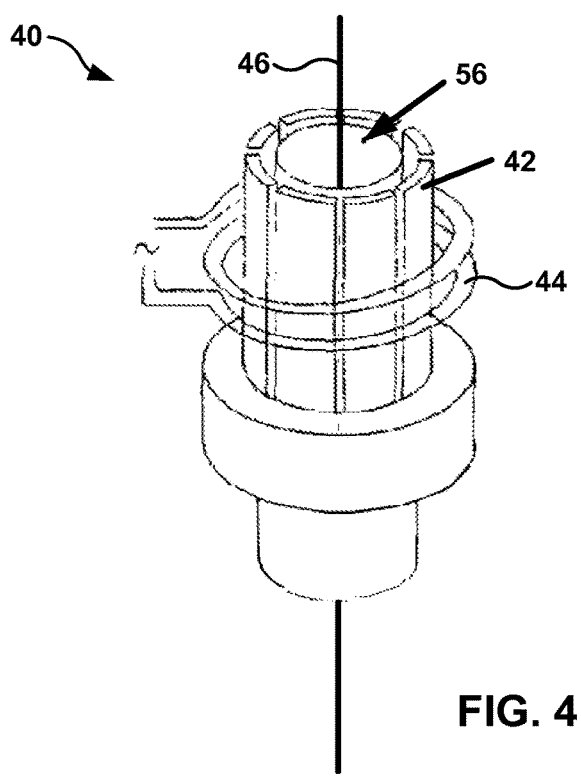
FIG. 4 is a conceptual diagram illustrating further detail of one example of the crucible heating stage shown in FIG. 3.

The technique of FIG. 1 also includes casting the material including iron and nitrogen in the presence of an applied magnetic field (14). FIGS. 2-4 illustrate example apparatuses that may be used to cast a material including iron and nitrogen in the presence of an applied magnetic field.

FIG. 2 is a conceptual diagram illustrating an example system 20 that utilizes an RF furnace 22, a crucible 26, and an optional quenching medium 28 to performing a casting technique on a mixture including iron and nitrogen. System 20 includes RF furnace 22, which encloses a crucible 26. Crucible may be formed of a material that is thermally stable at the temperatures within RF furnace 22 during the heating of the mixture including iron and nitrogen. For example, crucible 26 may include one or more refractory material, such as graphite, a refractory ceramic, or the like.

RF furnace 22 also includes a RF source 24, represented in FIG. 2 as a plurality of coils used to generate an RF field and heat at least the mixture including iron and nitrogen in crucible 26. In some examples, RF source 24 may generate RF energy with a frequency of about 13.56 GHz or about 900 MHz in some examples. RF source 24 may heat the mixture including iron and nitrogen inductively, either directly, or by heating a structure within RF furnace 22 (e.g., crucible 26), which then heats the mixture including iron and nitrogen. The mixture including iron and nitrogen may be heated within RF furnace 22 to above the melting temperature of the mixture including iron and nitrogen to form a molten mixture including iron and nitrogen.

In some examples, the shape of crucible 26 may define the shape the mixture including iron and nitrogen, such as at least one wire, ribbon, or other article having length that is greater than its width or diameter. In some examples, during the casting process, the temperature of the crucible 26 may be maintained at a temperature between about 650° C. and about 1200° C. In some examples, during the casting process, the temperature of the crucible 26 may be maintained at a temperature between about 800° C. and about 1200° C. The casting process can be conducted in air, a nitrogen environment, an inert environment, a partial vacuum, a full vacuum, or any combination thereof. The casting process can be at any pressure, for example, between about 0.1 GPa and about 20 GPa.

System 20 also includes a magnetic field generator 30, which generate an external magnetic field 32 to which the RF furnace 22 and material within RF furnace (e.g., the molten mixture including iron and nitrogen) are exposed. The external magnetic field 32 may be applied to the material including iron and nitrogen during cooling of the molten mixture including iron and nitrogen to a solid material. In some examples, the external magnetic field 32 also may be applied throughout the time the mixture including iron and nitrogen is molten. In some examples, the external magnetic field 32 also may be applied while the solid material including iron and nitrogen is melted to form the molten mixture including iron and nitrogen.

The external magnetic field 32 may affect nucleation and grown of grains during cooling and solidification of the molten mixture of iron and nitrogen to a solid mixture of iron and nitrogen. For example, while not wishing to be bound by any theory of operation, the Gibbs free energy of a grain may depend on its orientation relative to the external magnetic field 32. For example, grain in which a (002) plane or a (004) plane is substantially parallel (e.g., parallel or nearly parallel (such as within about 5 degrees from parallel)) to the external magnetic field 32 may have a lower Gibbs free energy than a grain in which a (110) plane, a (112) plane, a (202) plane, or a (200) plane is substantially parallel (e.g., parallel or nearly parallel (such as within about 5 degrees from parallel)) to the external magnetic field 32. Because of this, grains may be more likely to nucleate and grow with a (002) plane or a (004) plane is substantially parallel (e.g., parallel or nearly parallel (such as within about 5 degrees from parallel)) to the external magnetic field 32. This may facilitate substantial orientation (e.g., orientation or near orientation) of crystal axes of iron or iron nitride crystals formed during the casting process, which may help in substantially aligning (e.g., aligning or nearly aligning (such as within about 5 degrees from alignment)) crystal axes of $\alpha''\text{-Fe}_{16}N_2$ when formed.

Additionally or alternatively, the external magnetic field 32 may facilitate diffusion of nitrogen into interstitial spaces in the iron lattice, which may reduce or substantially prevent nitrogen from diffusion out of the material including iron and nitrogen. While not wishing to be bound by any theory of operation, it is currently believed that the external magnetic field 32 interacts with the iron crystal lattice, and may distort the crystal lattice as the iron crystals are nucleating and growing. The distortion of the iron crystal lattice may allow nitrogen to more easily diffuse into interstitial spaces in the iron lattice. Once the nitrogen has diffused into interstitial spaces in the iron lattice, it may be more difficult for the nitrogen to diffuse out of the iron lattice. Additionally or alternatively, while not wishing to be bound by any theory of operation, it is currently believed that the external magnetic field 32 may damp convection in the molten iron nitride mixture, which may reduce movement of the nitrogen atoms ahead of the solid-liquid interface during grown of the iron nitride crystals.

The external magnetic field 32 also may influence the iron grain size, grain size homogeneity, grain boundaries, grain shape as the external magnetic field 32 may affect nucleation density and defect density during the nucleation and growth process. For example, due to application of external magnetic field 32, in addition to possessing uniaxial magnetic anisotropy, the workpiece formed by casting the material including iron and nitrogen in the presence of an applied magnetic field (14) may include at least one iron nitride crystal or grain that defines an anisotropic shape. The at least one anisotropically-shaped iron nitride crystal or grain may define an aspect ratio of between about 1.1 and about 50, such as between about 1.4 and about 50, or between 2.2 and about 50, or between about 5 and about 50. As used herein, aspect ratio is defined as the ratio of the length of a longest dimension to the length of a shortest dimension of the anisotropic grain, where shortest dimension is measured in a direction substantially orthogonal (e.g., orthogonal or nearly orthogonal (such as within about 5 degrees from orthogonal)) to the longest dimension. In some examples, the shortest dimension of $\alpha''\text{-Fe}_{16}N_2$ crystal or grain 84 is between about 5 nm and about 300 nm.

In some examples, the longest dimension of the at least one anisotropically-shaped iron nitride crystal or grain may be substantially parallel (e.g., parallel or nearly parallel (such as within about 5 degrees from parallel)) to the direction of applied magnetic field 32, and thus, to the direction of the uniaxial magnetic anisotropy. Similarly, the longest dimension of the at least one anisotropically-shaped iron nitride crystal or grain may be substantially parallel (e.g., parallel or nearly parallel (such as within about 5 degrees from parallel)) to the easy axis of the magnetocrystalline anisotropy of the anisotropically-shaped iron nitride crystal or grain. For example, for body centered tetragonal (bct) $Fe_{16}N_2$ and Fe, (002) texture may be substantially parallel (e.g., parallel or nearly parallel (such as within about 5 degrees from parallel)) to the longest dimension of the crystal or grain. In this way, the shape anisotropy possessed by the anisotropically-shaped iron nitride crystal or grain may contribute to the magnetic anisotropy of the material.

In some examples, the applied magnetic field may affect properties of the grain boundaries, such as hardening grain boundaries. The applied magnetic field may facilitate generation of pinning sites, such as dopant atoms or defects, located at or near grain boundaries during the casting process (14), which may increase a hardness of the grain boundaries (e.g., a region within about 1 nm to about 100 nm of a grain boundary). For example, the applied magnetic field may facilitate movement of dopant atoms or defects within grains toward grain boundaries.

In some examples, the external magnetic field 32 may be a static magnetic field generated by a DC mode electromagnet. A static magnetic field may not change as a function of time during the casting technique. The DC mode external magnetic field 32 may have a magnetic flux density between about 0.01 Tesla (T) and about 50 T. In some examples, the external magnetic field 32 may be at least 0.2 T. In some examples, the external magnetic field 32 may be at least about 0.2 T, at least about 2 T, at least about 2.5 T, at least about 6 T, at least about 7 T, at least about 8 T, at least about 9 T, at least about 10 T, or higher. In some examples, the external magnetic field 32 is between about 5 T and about 10 T. In other examples, the external magnetic field 32 is between about 8 T and about 10 T. In other examples, the external magnetic field 32 may be a varying magnetic field generated by an AC mode electromagnet. A varying magnetic field may change as a function of time during the casting technique. The AC mode external magnetic field 32 may have a magnetic flux density between about 0.01 Tesla and about 50 Tesla. In some examples, the external magnetic field 32 may be at least 0.2 T. In some examples, the external magnetic field 32 may be at least about 0.2 T, at least about 2 T, at least about 2.5 T, at least about 6 T, at least about 7 T, at least about 8 T, at least about 9 T, at least about 10 T, or higher. In some examples, the external magnetic field 32 is between about 5 T and about 10 T. In other examples, the external magnetic field 32 is between about 8 T and about 10 T.

In some examples, the external magnetic field 32 may be substantially uniform (e.g., uniform or nearly uniform (e.g., within about 5%) throughout RF furnace 22, or at least throughout a volume contained by crucible 26. In other examples, the external magnetic field 32 may vary as a function of position. For example, the external magnetic field 32 may vary in along the direction of the external magnetic field (indicated by the direction of the arrows in FIG. 2). For example, the gradient may be between about 0.01 Tesla per meter (about 0.00001 Tesla per millimeter) and about 1000 Tesla per meter (about 1 Tesla per millimeter), such as between about 0.01 Tesla per meter (about 0.00001 Tesla per millimeter) and about 50 Tesla per meter (about 0.05 Tesla per millimeter), or between about 1 Tesla per meter (about 0.001 Tesla per millimeter) and about 1000 Tesla per meter (about 1 Tesla per millimeter). In some examples, the gradient may be a monotonic increase or decrease in the flux density of the external magnetic field 32.

During the casting of the material including iron and nitrogen in the presence of external magnetic field 32 (14), the molten material including iron and nitrogen may be allowed to cool and solidify. In some examples, this cooling process may be relatively slow, e.g., cooling may be caused by stopping heating of RF furnace 22. In other examples, the molten material including iron and nitrogen may be quenched in a quenching medium to cool and solidify the material including iron and nitrogen more quickly. The system in FIG. 2 optionally includes a quenching medium 28. In some examples, quenching medium 28 may include water (room temperature, cold, or ice water), oil, brine, ammonia water, or an amide. The molten material including iron and nitrogen may be poured into the quenching medium, or the quenching medium may be circulated about crucible 26 or the solidified (but still hot) material including iron and nitrogen. The temperature of the quenching medium 28, when used, may be between about −269° C. and about 210° C.

The casted material including iron and nitrogen may include at least one type of iron nitride. The at least one type of iron nitride, such as, for example, FeN, $Fe_2N$ (e.g., $\xi$-$Fe_2N$), $Fe_3N$ (e.g., $\varepsilon$-$Fe_3N$), $Fe_4N$ (e.g., $\gamma'$-$Fe_4N$ and/or $\gamma$-$Fe_4N$), $Fe_2N_6$, $\alpha$-$Fe_8N$, $\alpha''$-$Fe_{16}N_2$, or $FeN_x$ (where x is between about 0.05 and about 0.5), in addition to iron and/or nitrogen. The casted material then may undergo further processing to convert at least some of the types of iron nitride to $\alpha''$-$Fe_{16}N_2$. Some examples of further processing will be described below with respect to FIG. 11.

In some examples, rather than using the system illustrated in FIG. 2, another type of apparatus may be used to cast a mixture including iron and nitrogen in the presence of an external magnetic field. FIG. 3 illustrates a conceptual diagram of a system 40 that includes a crucible heating stage 42 that may be used to cast a material including iron and nitrogen 46 in the presence of an external magnetic field. FIG. 4 is a conceptual diagram illustrating further detail of one example of the crucible heating stage 42 shown in FIG. 3.

As best seen in FIG. 3, material including iron and nitrogen 46 is wrapped by a cover material 48. Cover material 48 may be glass or another amorphous material with a melting point similar to glass. Cover material 48 may substantially encapsulate (e.g., encapsulate or nearly encapsulate) the material including iron and nitrogen 46. Because cover material 48 is amorphous, it can tightly wrap the material and apply stress force on the material. In this way, cover material 48 may facilitate introducing strain to material including iron and nitrogen 46, which may lead to formation of a material with high saturation magnetization. The material including iron and nitrogen 46 may be in a shape such as a wire, ribbon, film, or the like, prior to entering crucible heating stage 42.

In the example shown in FIGS. 3 and 4, the material including iron and nitrogen 46 passes through crucible heating stage 42 vertically, from top to bottom of the figures. In other examples, the material including iron and nitrogen 46 may pass through crucible heating stage 42 vertically, from bottom to top of the figures.

Crucible heating stage 42 defines an aperture 56 through which the material including iron and nitrogen 46 passes (e.g., in which a portion of the material including iron and nitrogen 46 is disposed). In some examples, no portion of crucible heating stage 42 contacts the material including iron and nitrogen 46 during the heating of the material including iron and nitrogen 46. In some implementations, this is advantageous as it lower a risk of unwanted elements or chemical species contacting and diffusing into the material including iron and nitrogen 46. Unwanted elements or chemical species may affect properties of the material including iron and nitrogen 46; thus, it may be desirable to reduce or limit contact between the material including iron and nitrogen 46 and other materials.

Crucible heating stage 42 also includes an inductor 44 that surrounds at least a portion of aperture 56 defined by crucible heating stage 42. Inductor 44 includes an electrically conductive material, such as aluminum, silver, or copper, through which an electric current may be passed.

The electric current passed through inductor 44 may by an alternating current (AC), which may induce eddy currents in the material including iron and nitrogen 46 and heat the material including iron and nitrogen 46.

The material including iron and nitrogen 46 is heated by the eddy currents to form a molten material including iron and nitrogen 46. In some examples, although not shown in FIGS. 3 and 4, during the melting process, the molten material including iron and nitrogen 46 is drawn axially, such that a thickness or diameter of the molten material including iron and nitrogen 46 is reduced compared to the solid material including iron and nitrogen 46. During the melting process, the molten material including iron and nitrogen 46 continues to be substantially encapsulated by the cover material 48.

In some examples, the molten material including iron and nitrogen may be drawn through an aperture in a coil 50, which may be define a cross-sectional size and shape of casted material including iron and nitrogen 52.

Optionally, casted material including iron and nitrogen 52 may be exposed to a cooling medium, such as water (room temperature, cold, or ice water), oil, brine, ammonia water, or an amide to facilitate cooling of casted material including iron and nitrogen 52. In other examples, casted material including iron and nitrogen 52 may be air cooled.

During the melting and cooling portions of the casting technique, the material including iron and nitrogen 48 (solid, molten, and casted 52) is exposed to an external magnetic field 56 generated by magnet 54. The external magnetic field 56 may affect nucleation and grown of grains during cooling and solidification of the molten material including iron and nitrogen 48 to casted material including iron and nitrogen 52, as described above with respect to FIG. 2. Additionally or alternatively, the external magnetic field 56 may facilitate diffusion of nitrogen into interstitial spaces in the iron lattice, which may reduce or substantially prevent (e.g., prevent or nearly prevent) nitrogen from diffusion out of the material including iron and nitrogen. The external magnetic field 56 also may influence the iron grain size and grain boundaries, as the external magnetic field 56 may affect nucleation density and defect density during the nucleation and growth process.

In some examples, the external magnetic field 56 may similar to or substantially the same (e.g., the same or nearly the same) as external magnetic field 32 described with respect to FIG. 2. For example, external magnetic field 56 may be a static magnetic field generated by a DC mode electromagnet, and may have a magnetic flux density between about 0.01 Tesla and about 50 Tesla. In other examples, the external magnetic field 56 may be a varying magnetic field generated by an AC mode electromagnet, and may have a magnetic flux density between about 0.01 Tesla and about 50 Tesla. In some examples, the external magnetic field 56 may be at least 0.2 T. In some examples, the external magnetic field 56 may be at least about 0.2 T, at least about 2 T, at least about 2.5 T, at least about 6 T, at least about 7 T, at least about 8 T, at least about 9 T, at least about 10 T, or higher. In some examples, the external magnetic field 56 is between about 5 T and about 10 T. In other examples, the external magnetic field 56 is between about 8 T and about 10 T. In some examples, the external magnetic field 56 may be substantially uniform (e.g., uniform or nearly uniform (such as within about 5%)) throughout crucible heating stage 42, or at least throughout a volume of the material including iron and nitrogen 48. In other examples, the external magnetic field 56 may vary as a function of position. For example, the external magnetic field 56 may vary in along the direction of the external magnetic field (indicated by the direction of the arrows in FIG. 3). For example, the gradient may be between about 0.01 Tesla per meter (about 0.00001 Tesla per millimeter) and about 1000 Tesla per meter (about 1 Tesla per millimeter), such as between about 0.01 Tesla per meter (about 0.00001 Tesla per millimeter) and about 50 Tesla per meter (about 0.05 Tesla per millimeter), or between about 1 Tesla per meter (about 0.001 Tesla per millimeter) and about 1000 Tesla per meter (about 1 Tesla per millimeter). In some examples, the gradient may be a monotonic increase or decrease in the flux density of the external magnetic field 56.

The casted material including iron and nitrogen 52 may include at least one type of iron nitride. The at least one type of iron nitride, such as, for example, FeN, $Fe_2N$ (e.g., $\xi$-$Fe_2N$), $Fe_3N$ (e.g., $\epsilon$-$Fe_3N$), $Fe_4N$ (e.g., $\gamma'$-$Fe_4N$ and/or $\gamma$-$Fe_4N$), $Fe_2N_6$, $\alpha$-$Fe_8N$, $\alpha''$-$Fe_{16}N_2$, or $FeN_x$ (where x is between about 0.05 and about 0.5), in addition to iron and/or nitrogen. The casted material then may undergo further processing to convert at least some of the types of iron nitride to $\alpha''$-$Fe_{16}N_2$. Some examples of further processing will be described below with respect to FIG. 11.

Figure 5:
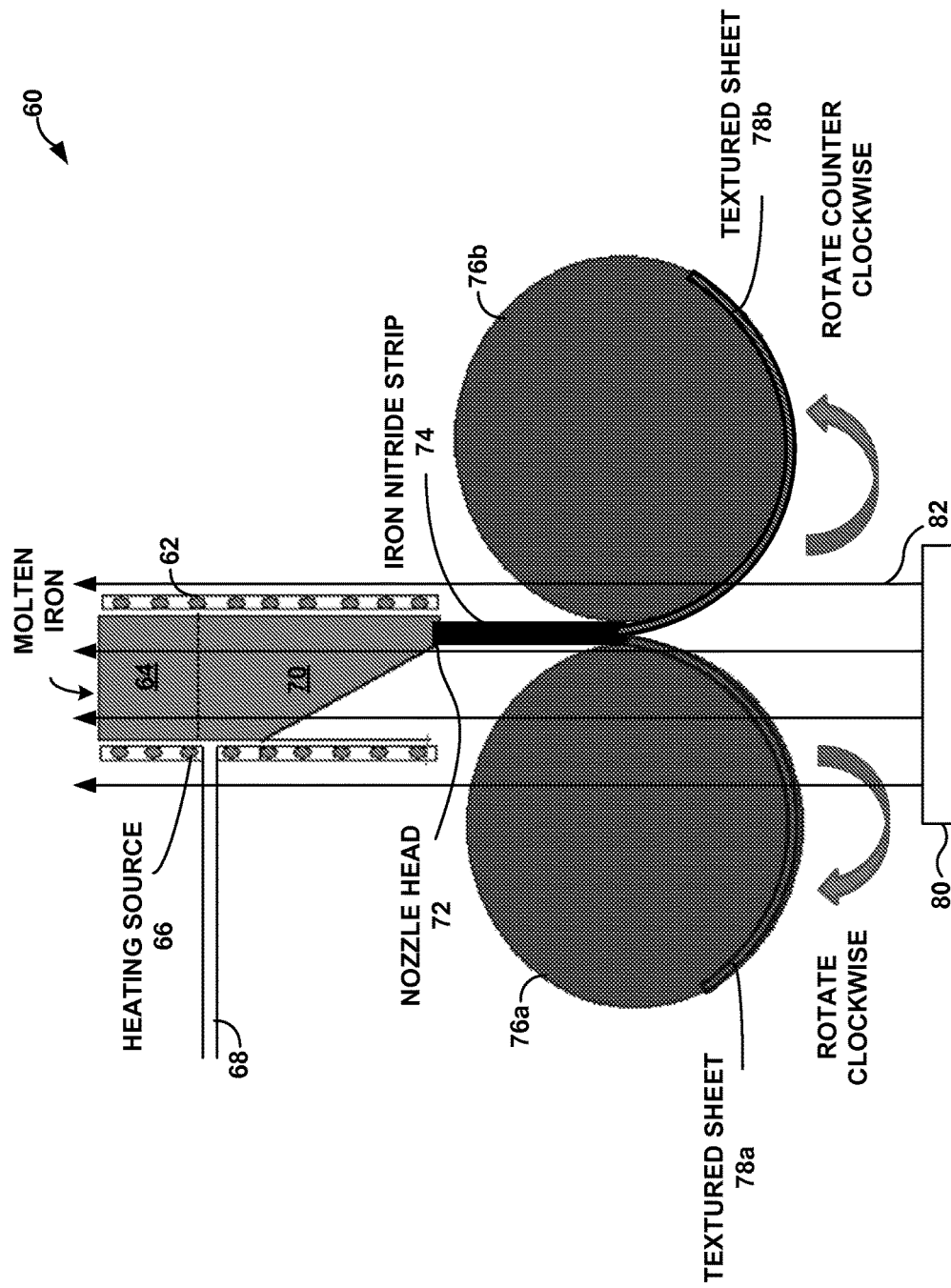
FIG. 5 is a conceptual diagram illustrating another example system for belt casting an example iron nitride workpiece in the presence of an external magnetic field.

FIG. 5 is a conceptual diagram illustrating another example system 60 for belt casting an example iron nitride workpiece in the presence of an external magnetic field. Belt casting system 60 may include an ingot chamber 62 which contains molten iron ingot 64, and is heated by heating source 66, e.g., in the form of a heating coil. In some examples, the temperature of molten iron ingot 64 within ingot chamber 62 may be greater than about 1800 Kelvin (K; about 1526.85° C.). The pressure of the iron ingot 64 within ingot chamber 62 may be between about 0.06 MPa and about 0.12 MPa.

Ingot chamber 62 also includes a nitrogen inlet 68, through which a nitrogen source is introduced into molten iron ingot 64 to form a molten iron nitride mixture 70. Nitrogen may be provided through nitrogen inlet 68 in a variety of forms or from a variety of sources. For example, nitrogen may be provided in the form of ammonia, ammonium azide, or urea, which may be introduced through nitrogen inlet 68, and then break down to release nitrogen atoms upon mixing with molten iron in molten iron nitride mixture 70.

In some examples, the nitrogen source may be provided to result in an approximately stoichiometric number of nitrogen atoms within the iron nitride mixture 70. The stoichiometric ratio of iron to nitrogen in $Fe_{16}N_2$ is 8:1. Thus, the approximate number of iron atoms in iron nitride mixture 70 may be determined, and a number of nitrogen atoms equal to approximately ⅛ (12.5%) of the iron atoms may be provided through nitrogen inlet 68 to the iron nitride mixture 70, such as between about 8 at. % and about 15 at. %.

Molten iron nitride mixture 70 flows out of ingot chamber 62 through nozzle head 72 to form iron nitride strip 74. Iron nitride strip 74 is fed into the gap zone between the surfaces of first pinch roller 76a and second pinch roller 76b (collectively, "pinch rollers 76"), which are rotated in opposite directions. In some examples, the distance from nozzle head 72 to the surfaces of pinch rollers 76 may be between about 1 mm and about 50 mm, such as about 4 mm.

In some examples, the rotation speed of first pinch roller 76a and second pinch roller 76b may vary from approximately 10 rotations per minute (rpm) to 5000 rpm, and the rotation speed of the rollers 76 may be approximately the same. In some examples, pinch rollers 76 are actively cooled, e.g., using water cooling, which maintains the surfaces of rollers 76 at a temperature below the temperature of iron nitride strip 74 and aids in cooling and casting iron nitride strip 74. For example, the temperatures of pinch rollers 76 may be maintained between about 300 K (about 26.85° C.) and about 400 K (about 126.85° C.). The pressure exerted on the iron nitride strip 74 by pinch rollers 76 may be between about 0.04 MPa and about 0.1 MPa.

After iron nitride strip 74 is pressed between pinch rollers 76 and cooled, iron nitride strip 74 forms textured iron nitride sheets 78a and 78b. In some examples, textured iron nitride sheets 78a and 78b (collectively, "textured iron nitride sheets 78") may form textured iron nitride ribbon with at least one dimension (e.g., a thickness) between about 1 μm and about 10 mm, such as between about 5 μm and about 1 cm (either individually or after compression of multiple textured iron nitride sheets 78). Each of textured iron nitride sheets 78 may include, for example, a (002) or (004) crystal texture. In other words, a major surface of each of textured iron nitride sheets 78 may be parallel to the (002) or (004) surfaces of all or substantially all of the iron crystals within the respective one of textured iron nitride sheets 78. By using a textured iron nitride sheet 78a or 78b in which all or substantially all (e.g., all or nearly all (such as greater than 95%)) of the iron crystals have substantially aligned (e.g., aligned or nearly aligned (such as within about 5 degrees from being aligned)) crystal axes in the subsequent processing steps, anisotropy formed when forming the $Fe_8N$ and $Fe_{16}N_2$ phase domains may be substantially aligned among the crystals.

During the belt casting technique, magnet 80 may generate an external magnetic field 82, to which at least molten iron nitride mixture 70 and iron nitride strip 74 are exposed. The external magnetic field 82 may affect nucleation and grown of grains during cooling and solidification of molten iron nitride mixture 70 to iron nitride strip 74, as described above with respect to FIG. 2. Additionally or alternatively, the external magnetic field 82 may facilitate diffusion of nitrogen into interstitial spaces in the iron lattice, which may reduce or substantially prevent (e.g., prevent or nearly prevent) nitrogen from diffusion out of the material including iron and nitrogen. The external magnetic field 82 also may influence the iron grain size and grain boundaries, as the external magnetic field 82 may affect nucleation density and defect density during the nucleation and growth process.

In some examples, the external magnetic field 82 may similar to or substantially the same as external magnetic field 32 described with respect to FIG. 2. For example, external magnetic field 82 may be a static magnetic field generated by a DC mode electromagnet, and may have a magnetic flux density between about 0.01 Tesla and about 50 Tesla. In some examples, the external magnetic field 82 may be at least 0.2 T. In some examples, the external magnetic field may be at least about 0.2 T, at least about 2 T, at least about 2.5 T, at least about 6 T, at least about 7 T, at least about 8 T, at least about 9 T, at least about 10 T, or higher. In some examples, the external magnetic field 82 is between about 5 T and about 10 T. In other examples, the external magnetic field 82 is between about 8 T and about 10 T. In other examples, the external magnetic field 82 may be a varying magnetic field generated by an AC mode electromagnet, and may have a magnetic flux density between about 0.01 Tesla and about 50 Tesla. In some examples, the external magnetic field 82 may be at least 0.2 T. In some examples, the external magnetic field 82 may be at least about 0.2 T, at least about 2 T, at least about 2.5 T, at least about 6 T, at least about 7 T, at least about 8 T, at least about 9 T, at least about 10 T, or higher. In some examples, the external magnetic field 82 is between about 5 T and about 10

T. In other examples, the external magnetic field 82 is between about 8 T and about 10 T. In some examples, the external magnetic field 82 may be substantially uniform (e.g., uniform or nearly uniform (such as within about 5%)) throughout belt casting system 60, or at least throughout a volume of molten iron nitride mixture 70 and iron nitride strip 74. In other examples, the external magnetic field 82 may vary as a function of position. For example, the external magnetic field 82 may vary in along the direction of the external magnetic field (indicated by the direction of the arrows in FIG. 5). For example, the gradient may be between about 0.01 Tesla per meter (about 0.00001 Tesla per millimeter) and about 1000 Tesla per meter (about 1 Tesla per millimeter), such as between about 0.01 Tesla per meter (about 0.00001 Tesla per millimeter) and about 50 Tesla per meter (about 0.05 Tesla per millimeter), or between about 1 Tesla per meter (about 0.001 Tesla per millimeter) and about 1000 Tesla per meter (about 1 Tesla per millimeter). In some examples, the gradient may be a monotonic increase or decrease in the flux density of the external magnetic field 82.

The iron nitride strip 74 may include at least one type of iron nitride. The at least one type of iron nitride, such as, for example, FeN, $Fe_2N$ (e.g., $\xi$-$Fe_2N$), $Fe_3N$ (e.g., $\varepsilon$-$Fe_3N$), $Fe_4N$ (e.g., $\gamma'$-$Fe_4N$ and/or $\gamma$-$Fe_4N$), $Fe_2N_6$, $\alpha$-$Fe_8N$, $\alpha''$-$Fe_{16}N_2$, or $FeN_x$ (where x is between about 0.05 and about 0.5), in addition to iron and/or nitrogen. The iron nitride strip 74 then may undergo further processing to convert at least some of the types of iron nitride to $\alpha''$-$Fe_{16}N_2$. Some examples of further processing will be described below with respect to FIG. 11.

Figure 6:
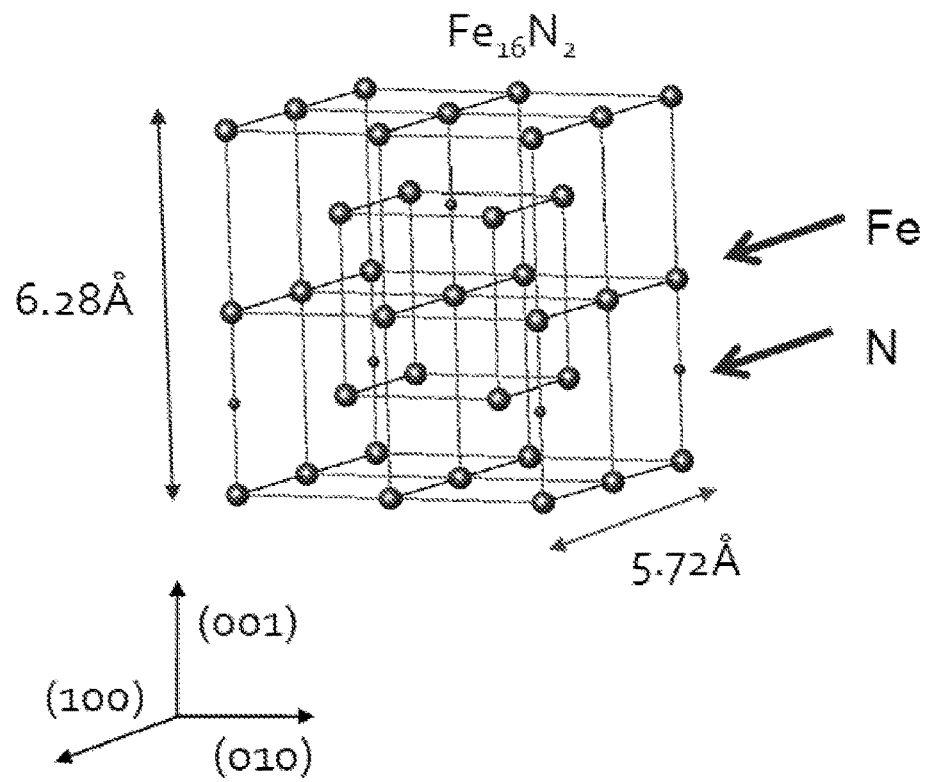
FIG. 6 is a conceptual diagram that shows an $\alpha''\text{-Fe}_{16}N_2$ unit cell.

The above examples have described casting techniques in which the material including a mixture of iron and nitrogen is exposed to a magnetic field during the casting techniques. The disclosure also describes compaction techniques for joining a plurality of workpieces including $\alpha''$-$Fe_{16}N_2$ phase domains in the presence of an external magnetic field. FIG. 6 is a conceptual diagram that shows an $\alpha''$-$Fe_{16}N_2$ unit cell. As shown in FIG. 6, in the $\alpha''$-$Fe_{16}N_2$ phase, the N atoms are aligned along the (002) (iron) crystal planes. The iron nitride unit cell is distorted such that the length of the unit cell along the <001> axis is approximately 6.28 angstroms (Å) while the length of the unit cell along the <010> and <100> axes is approximately 5.72 Å. The $\alpha''$-$Fe_{16}N_2$ unit cell may be referred to as a body-center-tetragonal (bct) unit cell when in the strained state. When the $\alpha''$-$Fe_{16}N_2$ unit cell is in the strained state, the <001> axis may be referred to as the c-axis of the unit cell. The c-axis may be the magnetic easy axis of the $\alpha''$-$Fe_{16}N_2$ unit cell. In other words, $\alpha''$-$Fe_{16}N_2$ crystals exhibit magnetic anisotropy.

$\alpha''$-$Fe_{16}N_2$ has high saturation magnetization and magnetic anisotropy constant. The high saturation magnetization and magnetic anisotropy constants result in a magnetic energy product that may be higher than rare earth magnets. For example, experimental evidence gathered from thin film $\alpha''$-$Fe_{16}N_2$ permanent magnets suggests that bulk $Fe_{16}N_2$ permanent magnets may have desirable magnetic properties, including an energy product of as high as about 134 MegaGauss*Oerstads (MGOe), which is about two times the energy product of NdFeB (which has an energy product of about 60 MGOe). Calculations and experiments show that the magnetocrystalline anisotropy of $\alpha''$-$Fe_{16}N_2$ may be about $1.0$-$2.0 \times 10^7$ erg/$cm^3$. $\alpha''$-$Fe_{16}N_2$ also has a relatively high theoretical magnetic saturation moment of about 2.9 Bohr magnetons per iron atom $\mu_B$/Fe. Additionally, iron and nitrogen are abundant elements, and thus are relatively inexpensive and easy to procure.

Figure 7:
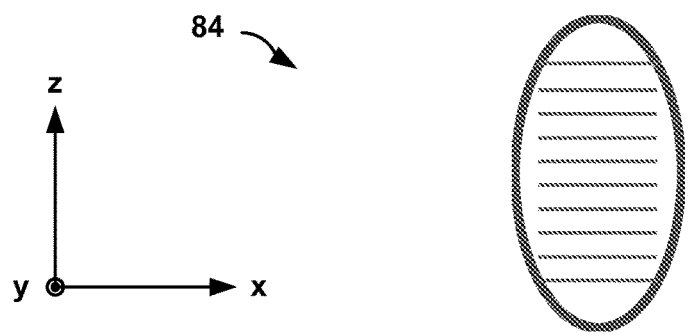
FIG. 7 is a conceptual diagram illustrating an example $\alpha''\text{-Fe}_{16}N_2$ crystal or grain that possesses an anisotropic shape.

Although not wishing to be bound by theory, three types of anisotropy may contribute to the magnetic anisotropy energy or magnetic anisotropy field of $\alpha''$-$Fe_{16}N_2$ or other iron-based magnetic materials. These three types of anisotropy include magnetocrystalline anisotropy, shape anisotropy, and strain anisotropy. As described above, magnetocrystalline anisotropy may be related to the distortion of the bcc iron crystalline lattice into the bct iron-nitride crystalline lattice shown in FIG. 6. Shape anisotropy may be related to the shape of the iron nitride crystals or grains, or to the shape of iron nitride workpieces. For example, as shown in FIG. 7, an $\alpha''$-$Fe_{16}N_2$ crystal or grain 84 may define a longest dimension (substantially parallel to the z-axis of FIG. 7, where orthogonal x-y-z axes are shown for ease of description only). $\alpha''$-$Fe_{16}N_2$ crystal or grain 84 also may define a shortest dimension (e.g., substantially parallel to the x-axis or y-axis of FIG. 7). The shortest dimension may be measured in a direction orthogonal to the longest axis of $\alpha''$-$Fe_{16}N_2$ crystal or grain 84.

In some examples, $\alpha''$-$Fe_{16}N_2$ crystal or grain 84 may define an aspect ratio of between about 1.1 and about 50, such as between about 1.4 and about 50, or between 2.2 and about 50, or between about 5 and about 50. In some examples, the shortest dimension of $\alpha''$-$Fe_{16}N_2$ crystal or grain 84 is between about 5 nm and about 300 nm.

Strain anisotropy may be related to strain exerted on the $\alpha''$-$Fe_{16}N_2$ or other iron-based magnetic materials. In some examples, $\alpha''$-$Fe_{16}N_2$ grains are disposed or embedded within a matrix that includes grains of iron or other types of iron nitride (e.g., $Fe_4N$). The $\alpha''$-$Fe_{16}N_2$ grains may possess a different coefficient of thermal expansion than the grains of iron or other types of iron nitride. This difference can introduce strain into the $\alpha''$-$Fe_{16}N_2$ grains due to differential dimensional changes in the $\alpha''$-$Fe_{16}N_2$ grains and the grains of iron or other types of iron nitride during thermal processing. Alternatively or additionally, the material or workpiece may be subjected to mechanical strain or strain due to exposure to an applied magnetic during processing to form $\alpha''$-$Fe_{16}N_2$ grains, at least some of which strain may remain in the material or workpiece after processing. Annealing may result in redistribution of the internal stress and local microstructure of the sample in order to reduce the magnetoelastic energy in the stressed state. The magnetic domain structure under strain anisotropy depends on the magnetoelastic energy, magnetostatic energy, and exchange energy.

Figure 8:
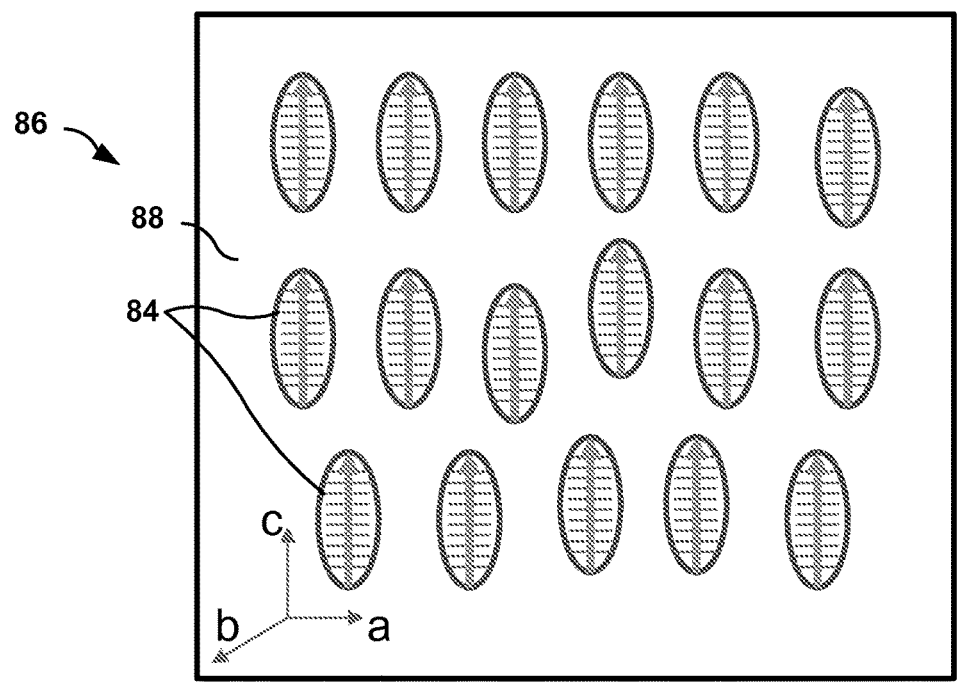
FIG. 8 is a conceptual diagram illustrating an example workpiece that includes a plurality of $\alpha''\text{-Fe}_{16}N_2$ crystal or grains in a matrix of other material.

FIG. 8 is a conceptual diagram illustrating an example workpiece 86 that includes a plurality of $\alpha''$-$Fe_{16}N_2$ crystal or grains 84 in a matrix 88 of other material. As shown in FIG. 8, each of the $\alpha''$-$Fe_{16}N_2$ crystal or grains 84 defines an anisotropic shape. Further, the magnetic easy axis of each respective $\alpha''$-$Fe_{16}N_2$ crystal or grain of the $\alpha''$-$Fe_{16}N_2$ crystal or grains 84 is substantially parallel to (e.g., parallel or nearly parallel (such as within about 5 degrees from parallel)) the respective longest dimension of the respective $\alpha''$-$Fe_{16}N_2$ crystal or grain. In some examples, the magnetic easy axis of each respective $\alpha''$-$Fe_{16}N_2$ crystal or grain may be substantially parallel (e.g., parallel or nearly parallel (such as within about 5 degrees from parallel)) the other respective magnetic easy axes (and, thus, substantially parallel (e.g., parallel or nearly parallel (such as within about 5 degrees from parallel)) the other respective longest dimensions). In some examples, this may be accomplished by casting the material used to form workpiece 86 in the presence of an applied magnetic field, as described above with respect to FIGS. 1-5. In this way, workpiece 86 may possess structural characteristics that result in magnetocrystalline anisotropy, shape anisotropy, and strain anisotropy all contributing to the anisotropy field of workpiece 86.

Figure 9:
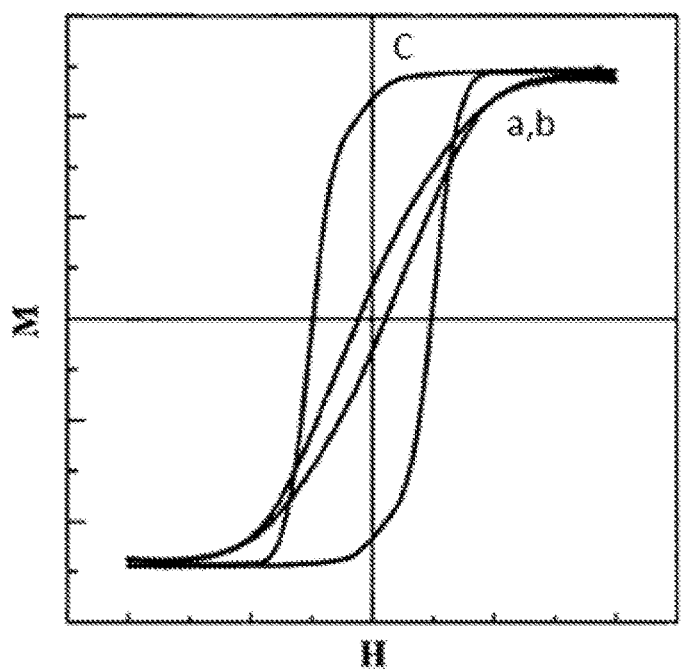
FIG. 9 is a diagram illustrating example hysteresis curves for the example workpiece illustrated in FIG. 8.

FIG. 9 is a diagram illustrating example hysteresis curves for workpiece 86. The hysteresis curves shown in FIG. 9 illustrate that workpiece 86 possesses magnetic anisotropy, as the coercivity (the x-axis intercepts) of workpiece 86 when the magnetic field is applied parallel to the c-axis direction of FIG. 8 is different than the coercivity (the x-axis intercepts) of workpiece 86 when the magnetic field is applied parallel to the a-axis and b-axis directions of FIG. 8.

Figure 10:
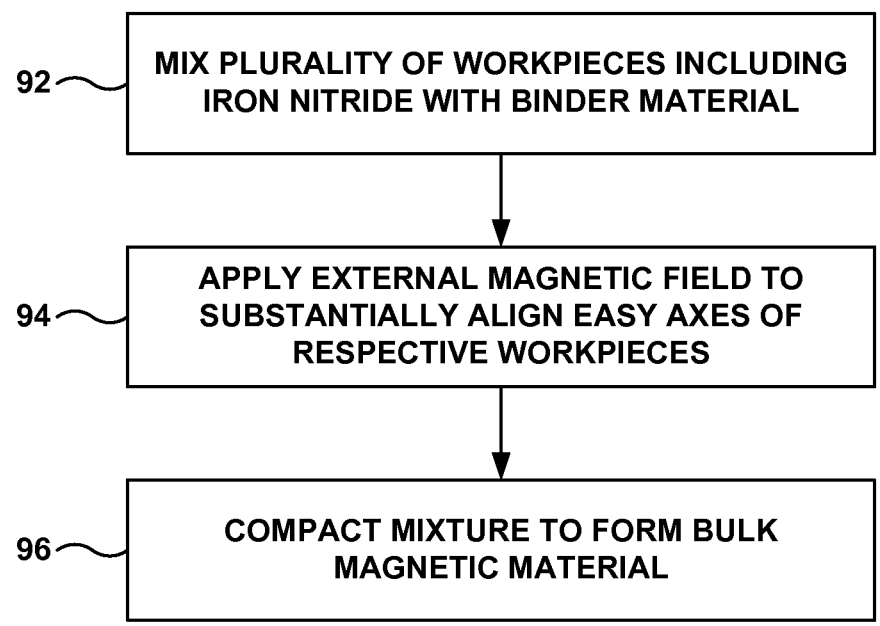
FIG. 10 is a flow diagram illustrating an example technique for consolidating a plurality of workpieces including at least one $\alpha''\text{-Fe}_{16}N_2$ phase domain to form a bulk magnetic material.

Producing bulk materials including $\alpha''\text{-}Fe_{16}N_2$ phase domains directly may be difficult. An alternative technique described herein includes forming smaller materials including $\alpha''\text{-}Fe_{16}N_2$ phase domains, then joining (or consolidating) the smaller materials to for a bulk magnetic material including $\alpha''\text{-}Fe_{16}N_2$ phase domains. FIG. 10 is a flow diagram illustrating an example technique for consolidating a plurality of workpieces including at least one $\alpha''\text{-}Fe_{16}N_2$ phase domain to form a bulk magnetic material.

In some examples, instead of consolidating a plurality of workpieces including at least one $\alpha''\text{-}Fe_{16}N_2$ phase domain to form a bulk magnetic material, the technique of FIG. 10 may include consolidating a plurality of workpieces including at least one iron-based phase domain including uniaxial magnetic anisotropy, such as strained iron, $Fe_{16}C_2$, or iron and at least one of B, O, P, Y, Mn, Co, Cr, Si, Al, or the like.

The technique of FIG. 10 includes mixing a plurality of workpieces including iron nitride with a binder material (92). At least some of the plurality of workpieces including iron nitride may include at least one $\alpha''\text{-}Fe_{16}N_2$ phase domain. In some examples, each of the plurality of workpieces including iron nitride may include at least one $\alpha''\text{-}Fe_{16}N_2$ phase domain. In addition, the plurality of workpieces may include other iron nitride phase domains (e.g., domains of FeN, $Fe_2N$ (e.g., $\xi\text{-}Fe_2N$), $Fe_3N$ (e.g., $\varepsilon\text{-}Fe_3N$), $Fe_4N$ (e.g., $\gamma'\text{-}Fe_4N$ and/or $\gamma\text{-}Fe_4N$), $Fe_2N_6$, $\alpha\text{-}Fe_8N$, or $FeN_x$ (where x is between about 0.05 and about 0.5), iron phase domains, or the like.

The plurality of workpieces may include any shape and size. In some examples, the workpieces include one dimension that is longer than other dimensions of the respective workpiece. Example workpieces with a dimension longer than other dimensions include fibers, wires, filaments, cables, films, thick films, foils, ribbons, sheets, or the like. In other examples, workpieces may not have a dimension that is longer than other dimensions of the workpiece. For example, workpieces can include grains or powders, such as spheres, cylinders, flecks, flakes, regular polyhedra, irregular polyhedra, and any combination thereof. Examples of suitable regular polyhedra include tetrahedrons, hexahedrons, octahedron, decahedron, dodecahedron and the like, non-limiting examples of which include cubes, prisms, pyramids, and the like.

The binder material may include any material that may be pressed with the plurality of workpieces to form a cohesive bulk material. In some examples, the binder may include a resin, a wax, or a low melting point metal. The low melting point metal may include, for example, zinc (Zn), tin (Sn), bismuth (Bi), gallium (Ga), sodium (Na), or lithium (Li). Example resins include natural or synthetic resins, including ion-exchange resins, such as those available under the trade designation Amberlite™, from The Dow Chemical Company, Midland, Mich.; epoxies, such as Bismaleimide-Triazine (BT)-Epoxy; a polyacrylonitrile; a polyester; a silicone; a prepolymer; a polyvinyl buryral; urea-formaldehyde, or the like.

The mixture including the plurality of workpieces and the binder then may be exposed to an external magnetic field (94). The external magnetic field may have a predetermined orientation with reference to the mixture including the plurality of workpieces and the binder. This predetermined orientation may be used to set the magnetization direction of the bulk material. For example, when the mixture including the plurality of workpieces and the binder is first mixed, the respective easy axes (e.g., c-axes of the $\alpha''\text{-}Fe_{16}N_2$) respective of the plurality of workpieces may be substantially randomly oriented (e.g., randomly oriented or nearly randomly oriented). If the bulk material is formed with the respective easy axes of the plurality of workpieces substantially randomly oriented, the magnetic anisotropy of the bulk material may be relatively low, which may reduce magnetic properties (such as energy product) of the bulk magnetic material.

By substantially aligning at least some of the respective easy axes of the workpieces using the external magnetic field, the magnetic anisotropy of the bulk magnetic material may be increased, which may improve magnetic properties (such as energy product) of the bulk magnetic material. The external magnetic field also may allow the magnetization direction of the bulk material to be defined, e.g., by substantially aligning at least some of the respective magnetic easy axes of the plurality of workpieces. For example, the mixture of binder and the plurality of workpieces may be disposed in a mold that defines a near net shape of the final magnetic material, and the external magnetic field may be oriented relative to the mold in a selected direction to define the magnetization direction of the bulk material.

In some examples, the external magnetic field may be a static magnetic field generated by a DC mode electromagnet, and may have a magnetic flux density between about 0.01 Tesla and about 50 Tesla. In some examples, the external magnetic field may be at least 0.2 T. In some examples, the external magnetic field may be at least about 0.2 T, at least about 2 T, at least about 2.5 T, at least about 6 T, at least about 7 T, at least about 8 T, at least about 9 T, at least about 10 T, or higher. In some examples, the external magnetic field is between about 5 T and about 10 T. In other examples, the external magnetic field is between about 8 T and about 10 T.

In other examples, the external magnetic field may be a varying magnetic field generated by an AC mode electromagnet, and may have a magnetic flux density between about 0.01 Tesla and about 50 Tesla. In some examples, the external magnetic field may be at least 0.2 T. In some examples, the external magnetic field 82 may be at least about 0.2 T, at least about 2 T, at least about 2.5 T, at least about 6 T, at least about 7 T, at least about 8 T, at least about 9 T, at least about 10 T, or higher. In some examples, the external magnetic field 82 is between about 5 T and about 10 T. In other examples, the external magnetic field 82 is between about 8 T and about 10 T. In some examples, the external magnetic field 82 may be substantially uniform throughout belt casting system 60, or at least throughout a volume of molten iron nitride mixture 70 and iron nitride strip 74. In other examples, the external magnetic field 82 may vary as a function of position. For example, the external magnetic field 82 may vary in along the direction of the external magnetic field (indicated by the direction of the arrows in FIG. 5). For example, the gradient may be between about 0.01 Tesla per meter (about 0.00001 Tesla per millimeter) and about 1000 Tesla per meter (about 1 Tesla per millimeter), such as between about 0.01 Tesla per meter (about 0.00001 Tesla per millimeter) and about 50 Tesla per meter (about 0.05 Tesla per millimeter), or between about 1 Tesla per meter (about 0.001 Tesla per millimeter) and about 1000 Tesla per meter (about 1 Tesla per millimeter). In some examples, the gradient may be a monotonic increase or decrease in the flux density of the external magnetic field 82.

While the mixture including the binder and the plurality of workpieces is being exposed to the external magnetic field (94), the mixture may be compacted to join the binder and the plurality of workpieces and form the bulk magnetic material (96). Compacting the mixture including the binder and the plurality of workpieces (96) may include exerting a pressure on the mixture. For example, the pressure may be between about 1 megapascals (MPa) and about 100 gigapascals (GPa) at room temperature. The compaction of the mixture including the binder and the plurality of workpieces may be performed at a relatively low temperature (e.g., between about −26893° C. (the boiling temperature of liquid helium at atmospheric pressure) and about room temperature (about 23° C.)). Alternatively, the compaction of the mixture including the binder and the plurality of workpieces may be performed at a relatively high temperature (e.g., between about room temperature (about 23° C.) and about 210° C.). The product of the compaction step may be a bulk magnetic material including $\alpha''\text{-}Fe_{16}N_2$ phase domains.

Figure 11:
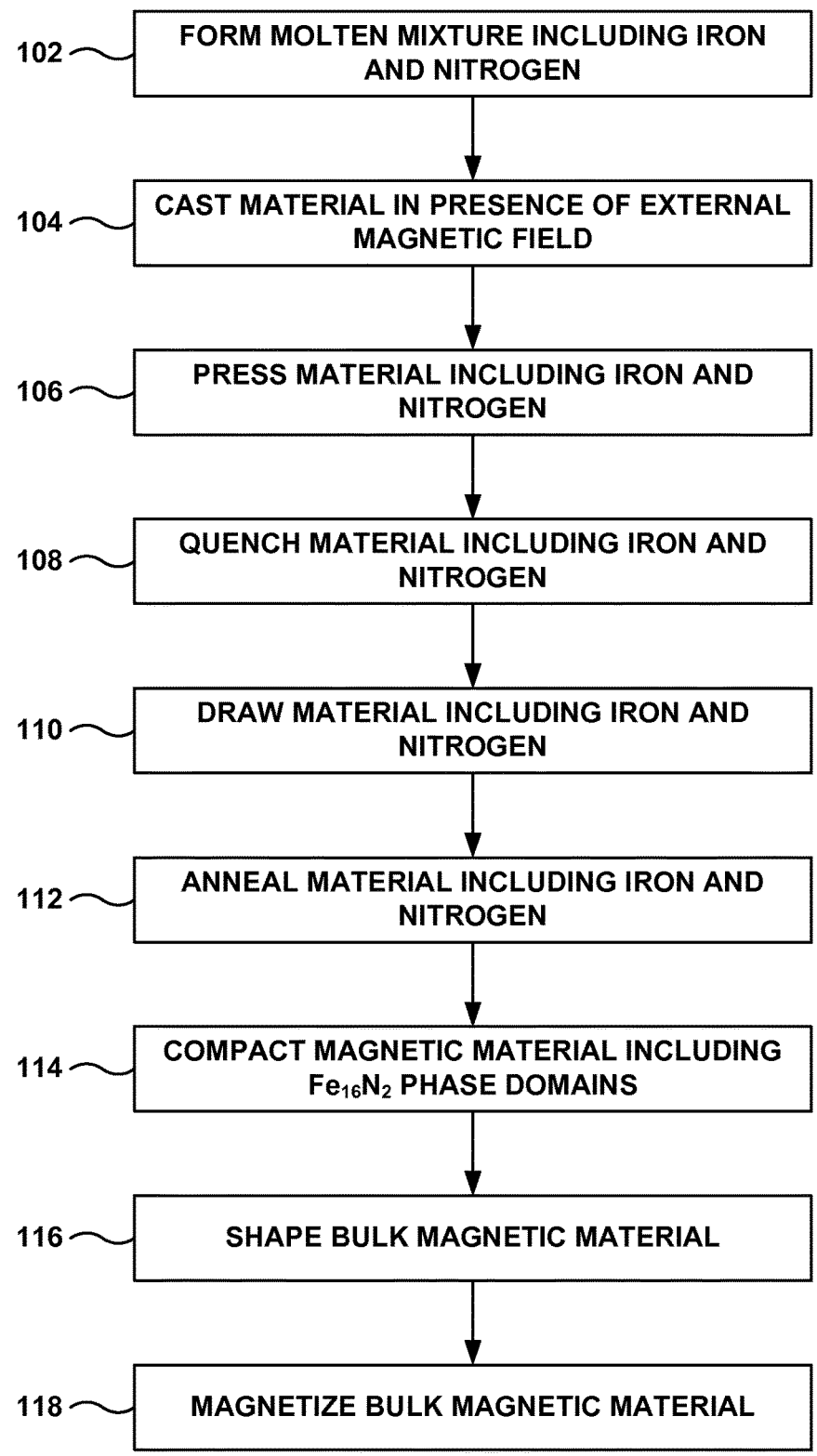
FIG. 11 is a flow diagram illustrating an example technique for forming a bulk magnetic material including $\alpha''\text{-Fe}_{16}N_2$ phase domains from a raw material including iron and nitrogen.

In some examples, the casting and compaction processes described herein may be performed together in the same overall technique for forming a bulk magnetic material including $\alpha''\text{-}Fe_{16}N_2$ phase domains. FIG. 11 is a flow diagram illustrating an example technique for forming a bulk magnetic material including $\alpha''\text{-}Fe_{16}N_2$ phase domains from a raw material including iron and nitrogen. The technique of FIG. 11 includes forming a molten mixture including iron and nitrogen (102). This step may be similar to or substantially the same as step (12) described with respect to FIG. 1. The technique of FIG. 11 also includes casting the molten mixture including iron and nitrogen in the presence of an external magnetic field (104). This step may be similar to or substantially the same as step (14) described with respect to FIG. 1.

The technique of FIG. 11 also optionally includes pressing the material including iron and nitrogen (106). The material including iron and nitrogen may be pressed to achieve the predetermined size of the material including iron and nitrogen. During the pressing process, the temperature of the material including iron and nitrogen may be maintained below about 250° C., and the material including iron and nitrogen may be exposed to a pressure between about 5 tons and 50 tons, depending on the desired final dimension (e.g., thickness or diameter) of the material including iron and nitrogen. In some examples, when the pressing process is complete, the material including iron and nitrogen may be in the shape of a workpiece with a dimension in one or more axis between about 0.001 mm and about 50 mm (e.g., a diameter between about 0.1 mm and about 50 mm for a wire or a thickness between about 0.001 mm and about 5 mm for a ribbon). The material including iron and nitrogen may include at least one $Fe_8N$ iron nitride phase domain after the pressing is complete.

In some examples, the technique also optionally includes quenching the material including iron and nitrogen (108). Quenching may set the crystalline structure and phase composition of the material including iron and nitrogen. For example, quenching may facilitate formation of $Fe_8N$ phase domains in the material including iron and nitrogen. In some examples, during the quenching process, the material including iron and nitrogen may be heated to a temperature above 650° C. for between about 0.5 hour and about 20 hours. In some examples, the temperature of the material including iron and nitrogen may be dropped abruptly below the martensite temperature of the workpiece alloy (Ms). For example, for $Fe_{16}N_2$, the martensite temperature (Ms) is about 250° C. The medium used for quenching can include a liquid, such as water, brine (with a salt concentration between about 1% and about 30%), a non-aqueous liquid or solution such as an oil, or liquid nitrogen. In other examples, the quenching medium can include a gas, such as nitrogen gas with a flow rate between about 1 sccm and about 1000 sccm. In other examples, the quenching medium can include a solid, such as salt, sand, or the like. In some examples, the workpieces including iron and nitrogen may be cooled at a rate of greater than 50° C. per second during the quenching process. In some examples, the quenching process can be assisted by a magnetic field and/or an electrical field.

The technique of FIG. 11 further may include drawing (or straining) and annealing the material including iron and nitrogen (110), (112). The straining and annealing process may convert at least some of $Fe_8N$ iron nitride phase domains in the material including iron and nitrogen to $Fe_{16}N_2$ phase domains. The stain may be exerted on the material including iron and nitrogen using a variety of strain inducing apparatuses. For example, the material including iron and nitrogen may be received by (e.g., wound around) a first set of rollers and a second set of rollers, and the sets of rollers may be rotated in opposite directions to exert a tensile force on the material including iron and nitrogen. In other examples, opposite ends of the material including iron and nitrogen may be gripped in mechanical grips, e.g., clamps, and the mechanical grips may be moved away from each other to exert a tensile force on the material including iron and nitrogen.

In some examples, the material including iron and nitrogen may be strained along a direction substantially parallel (e.g., parallel or nearly parallel (such as within about 5 degrees from parallel)) to a <001> axis of at least one iron crystal in the material including iron and nitrogen. A strain inducing apparatus may strain the material including iron and nitrogen to a certain elongation. For example, the strain on the material including iron and nitrogen may be between about 0.3% and about 12%. In other examples, the strain on the material including iron and nitrogen may be less than about 0.3% or greater than about 12%. In some examples, exerting a certain strain on the material including iron and nitrogen may result in a substantially similar strain on individual unit cells of the iron (or iron nitride), such that the unit cell is elongated along the <001> axis between about 0.3% and about 12%.

While the material including iron and nitrogen is strained, the material including iron and nitrogen may be heated to anneal the material including iron and nitrogen (112). The material including iron and nitrogen may be annealed by heating the material including iron and nitrogen to a temperature between about 100° C. and about 250° C., such as between about 120° C. and about 200° C. Annealing the material including iron and nitrogen while straining the material including iron and nitrogen may facilitate conversion of at least some of the iron nitride phase domains to $\alpha''\text{-}Fe_{16}N_2$ phase domains.

The annealing process may continue for a predetermined time that is sufficient to allow diffusion of the nitrogen atoms to the appropriate interstitial spaces. In some examples, the annealing process continues for between about 20 hours and about 100 hours, such as between about 40 hours and about 60 hours. In some examples, the annealing process may occur under an inert atmosphere, such as Ar, to reduce or substantially prevent oxidation of the iron. In some implementations, while the material including iron and nitrogen is annealed the temperature is held substantially constant. The drawing (110) and annealing (112) of the material including iron and nitrogen may result in a magnetic material including at least one α"-$Fe_{16}N_2$ phase domain.

In some examples, the material including iron and nitrogen may be exposed to an external magnetic field during the drawing (110) and annealing (112) of the material including iron and nitrogen. Annealing iron nitride materials in the presence of an applied magnetic field may enhance the $Fe_{16}N_2$ phase formation in iron nitride materials. Increased volume fractions of the $Fe_{16}N_2$ phase may improve the magnetic properties of the magnetic materials including iron nitride. Improved magnetic properties may include, for example, coercivity, magnetization, and magnetic orientation. In some examples, the applied magnetic field may be at least 0.2 Tesla (T). The temperature at which the magnetic field annealing is performed may at least partially depend upon further elemental additions to the iron nitride base composition and the approach used to initially synthesize the iron nitride base composition. In some examples, the magnetic field may be at least about 0.2 T, at least about 2 T, at least about 2.5 T, at least about 6 T, at least about 7 T, at least about 8 T, at least about 9 T, at least about 10 T, or higher. In some examples, the magnetic field is between about 5 T and about 10 T. In other examples, the magnetic field is between about 8 T and about 10 T. Further details regarding annealing the material including iron and nitrogen may be found in U.S. Provisional Application No. 62/019,046, filed Jun. 30, 2014, the entire content of which is incorporated herein by reference.

The technique of FIG. 11 also may include compacting a plurality of workpieces of magnetic material including at least one α"-$Fe_{16}N_2$ phase domain with a binder material to form a bulk magnetic material (114). This step may be similar to or substantially the same as the technique described with reference to FIG. 10.

The technique of FIG. 11 further may (optionally) include shaping the bulk magnetic material (116). The shaping process may include, for example, slicing or grinding surfaces of the bulk magnetic material to form a predetermined final shape of the bulk magnetic material. Finally, the technique of FIG. 11 further may (optionally) include magnetizing the bulk magnetic material (118). In this way, the technique of FIG. 11 describes an example technique for forming a bulk magnetic material including α"-$Fe_{16}N_2$ phase domains.

Clause 1: A method comprising: casting a material including iron in the presence of an applied magnetic field to form a workpiece including at least one iron-based phase domain including uniaxial magnetic anisotropy, wherein the applied magnetic field has a strength of at least about 0.01 Tesla (T).

Clause 2: The method of clause 1, wherein casting the material including iron comprises casting a material including iron and nitrogen in the presence of an applied magnetic field to form a workpiece including at least one iron-nitride phase domain.

Clause 3: The method of clause 1, wherein casting the material including iron comprises casting a material including iron and at least one of C, B, O, P, Y, Mn, Co, Cr, Si, Zn, or Al in the presence of an applied magnetic field to form a workpiece including at least one phase domain having uniaxial magnetic anisotropy.

Clause 4: The method of any one of clauses 1 to 3, wherein casting the material including iron in the presence of the applied magnetic field comprises: casting the material including iron in the presence of the applied magnetic field to form a workpiece including at least one anisotropically-shaped iron-based grain, wherein the at least one anisotropically-shaped iron-based grain comprises an aspect ratio of between about 1.1 and about 50, and wherein aspect ratio is defined as the ratio of the length of a longest dimension to the length of a shortest dimension of the anisotropic grain, where the longest dimension and shortest dimension are substantially orthogonal.

Clause 5: The method of clause 4, wherein the at least one anisotropically-shaped iron-based grain defines a shortest dimension of between about 5 nm and about 300 nm.

Clause 6: The method of clause 4 or 5, wherein the at least one anisotropically-shaped iron-based grain comprises a plurality of anisotropically-shaped iron-based grains, and wherein respective long axes of the plurality of anisotropically-shaped iron-based grains are oriented substantially parallel to each other.

Clause 7: The method of any one of clauses 4 to 6, wherein the respective long axes of the plurality of anisotropically-shaped iron-based grains are oriented substantially parallel to the direction of the applied magnetic field.

Clause 8: The method of any one of clauses 4 to 7, wherein, for each respective anisotropically-shaped iron-based grain, the respective easy axis of magnetocrystalline anisotropy is substantially parallel to the respective longest axis.

Clause 9: The method of any one of clauses 1 to 8, wherein the strength of the applied magnetic field is greater than about 0.02 T.

Clause 10: The method of any one of clauses 1 to 8, wherein the strength of the applied magnetic field is greater than about 2.5 T.

Clause 11: The method of any one of clauses 1 to 8, wherein the strength of the applied magnetic field is greater than about 9 T.

Clause 12: The method of any one of clauses 1 to 11, wherein the strength of the applied magnetic field is less than about 50 T.

Clause 13: The method of any one of clauses 1 to 12, wherein the material further comprises at least one dopant.

Clause 14: The method of clause 13, wherein the at least one dopant comprises at least one of Al, Mn, La, Cr, Co, Ti, Ni, Zn, Zr, Ca, or a rare earth metal.

Clause 15: The method of clause 13, wherein the at least one dopant comprises at least one of B, C, P, Si, or O.

Clause 16: The method of clause 2, wherein, prior to casting, the concentration of nitrogen in the material is between about 8 atomic percent (at. %) and about 9 at. %.

Clause 17: The method of any one of claims 1 to 16, wherein casting comprises: heating a mixture including iron to form a molten mixture including iron; and cooling the molten mixture including iron to form the workpiece.

Clause 18: The method of clause 17, wherein cooling the molten mixture comprises quenching the molten mixture in a quenching medium.

Clause 19: The method of clause 18, wherein the quenching medium comprises at least one of water, ice water, brine, an oil, ammonia water, or an amide.

Clause 20: The method of any one of clauses 17 to 19, wherein heating the mixture including iron comprises heating the mixture including iron in the presence of the applied magnetic field, and wherein cooling the molten mixture including iron comprises cooling the molten mixture including iron in the presence of the applied magnetic field.

Clause 21: The method of any one of clauses 17 to 20, wherein heating the mixture including iron comprises heating the mixture including iron in a crucible using a radio frequency furnace.

Clause 22: The method of any one of clauses 17 to 20, wherein heating the mixture including iron comprises heating the mixture including iron in a cold crucible, and wherein the mixture is substantially enclosed within a cover material.

Clause 23: The method of any one of clauses 17 to 20, wherein cooling the molten mixture including iron comprises cooling the molten mixture including iron between cooled rollers to form the workpiece.

Clause 24: A method comprising: compacting a plurality of workpieces, each workpiece including at least one iron-based phase domain including uniaxial magnetic anisotropy, in the presence of an applied magnetic field to form a bulk material including a plurality of iron-based phase domains including uniaxial magnetic anisotropy, wherein the applied magnetic field has a strength of at least about 0.01 Tesla (T), wherein the applied magnetic field defines the magnetization direction of the bulk material.

Clause 25: The method of clause 24, wherein the at least one iron-based phase domain including uniaxial magnetic anisotropy comprises at least one $\alpha''$-$Fe_{16}N_2$ phase domain.

Clause 26: The method of clause 24 or 25, wherein the at least one iron-based phase domain including uniaxial magnetic anisotropy comprises at least one of a body-centered tetragonal iron phase domain or a phase domain having a body-centered tetragonal crystalline structure and including iron and at least one of C, B, O, P, Y, Mn, Co, Cr, Si, Al, or Zn.

Clause 27: The method of clause 24 to 26, wherein the at least one iron-based phase domain including uniaxial magnetic anisotropy comprises at least one anisotropically-shaped iron-based grain, wherein the at least one anisotropically-shaped iron-based grain comprises an aspect ratio of between about 1.1 and about 50, and wherein aspect ratio is defined as the ratio of the length of a longest dimension to the length of a shortest dimension of the anisotropic grain, where the longest dimension and shortest dimension are substantially orthogonal.

Clause 28: The method of clause 27, wherein the at least one anisotropically-shaped iron-based grain defines a shortest dimension of between about 5 nm and about 300 nm.

Clause 29: The method of clause 27 or 28, wherein the at least one anisotropically-shaped iron-based grain comprises a plurality of anisotropically-shaped iron-based grains, and wherein respective long axes of the plurality of anisotropically-shaped iron-based grains are oriented substantially parallel to each other.

Claim 30: The method of any one of clauses 27 to 29, wherein the respective long axes of the plurality of anisotropically-shaped iron-based grains are oriented substantially parallel to the direction of the applied magnetic field.

Clause 31: The method of any one of clauses 27 to 30, wherein, for each respective anisotropically-shaped iron-based grain, the respective easy axis of magnetocrystalline anisotropy is substantially parallel to the respective longest axis.

Clause 32: The method of any one of clauses 24 to 31, wherein the strength of the applied magnetic field is greater than about 0.02 T.

Clause 33: The method of any one of clauses 24 to 31, wherein the strength of the applied magnetic field is greater than about 2.5 T.

Clause 34: The method of any one of clauses 24 to 31, wherein the strength of the applied magnetic field is greater than about 9 T.

Clause 35: The method of any one of clauses 24 to 34, wherein the strength of the applied magnetic field is less than about 50 T.

Clause 36: The method of any one of clauses 24 to 35, wherein at least one of the plurality of workpieces further comprises at least one dopant.

Clause 37: The method of clause 36, wherein the at least one dopant comprises at least one of Al, Mn, La, Cr, Co, Ti, Ni, Zn, Zr, Ca or a rare earth metal.

Clause 38: The method of clause 36, wherein the at least one dopant comprises at least one of B, C, P, Si, or O.

Clause 39: The method of any one of clauses 24 to 38, wherein the applied magnetic field is facilitates substantial alignment magnetic easy axes of at least some of the plurality of workpieces.

Clause 40: The method of any one of clauses 24 to 39, wherein compacting the plurality of workpieces comprises mixing the plurality of workpieces with at least one of a resin, a wax, or a low-melting-point metal to form a mixture, and pressing the mixture to form the bulk material.

Clause 41: The method of clause 40, wherein pressing the mixture comprises pressing the mixture at a pressure between about 1 MPa and about 100 GPa.

Clause 42: The method of clause 40 or 41, wherein pressing the mixture comprises cold pressing the mixture at a temperature between about 4.2 Kelvin and about 295 Kelvin.

Clause 43: The method of clause 40 or 41, wherein pressing the mixture comprises hot pressing the mixture at a temperature between about 295 Kelvin and about 533 Kelvin.

Clause 44: The method of any one of clauses 40 to 43, wherein mixing the plurality of workpieces with the at least one of the resin, the wax, or the low-melting-point metal comprises mixing the plurality of workpieces with the low-melting-point metal, and wherein the low-melting-point metal comprises at least one of Zn, Sn, Bi, Ga, Na, or Li.

Clause 45: The method of any one of clauses 24 to 44, wherein a workpiece of the plurality of workpieces comprises at least one of a powder, a ribbon, or a wire.

Clause 46: The method of any one of clauses 24 to 43, further comprising: the method of any one of clauses 1 to 22, wherein the workpiece is one of the plurality of workpieces.

Clause 47: An apparatus configured to perform any one of the methods of clauses 1 to 46.

Clause 48: A workpiece formed by the method of any one of clauses 1 to 23.

Clause 49: A bulk material formed by the method of any one of clauses 24 to 46.

Clause 50: The bulk material of clauses 49, wherein the bulk material is a bulk permanent magnet.

Clause 51: A method comprising: casting a material including at least one of nickel, iron and cobalt in the presence of an applied magnetic field to form a workpiece including at least one nickel, iron or cobalt-based phase domain including uniaxial magnetic anisotropy, wherein the applied magnetic field has a strength of at least about 0.01 Tesla (T).

Clause 52: The method of clause 51, wherein the metal comprises iron.

Clause 53: The method of clause 52, wherein casting the material including iron comprises casting a material including iron and nitrogen in the presence of an applied magnetic field to form a workpiece including at least one iron-nitride phase domain.

Clause 54: The method of any one of clauses 51 to 53, wherein casting the material including at least one of nickel, iron or cobalt comprises at least one of C, B, O, P, Y, Mn, Co, Cr, Si, Zn, or Al in the presence of an applied magnetic field to form a workpiece including at least one phase domain having uniaxial magnetic anisotropy.

Clause 55: The method of any one of clauses 51 to 54, wherein the material further comprises at least one dopant, and wherein the at least one dopant comprises at least one of B, C, P, Si, or O.

Clause 56: The method of any one of clauses 51 to 55, additionally comprising compacting a plurality of the workpieces.

Clause 57: A workpiece comprising: at least one anisotropically-shaped iron-based grain, wherein the at least one anisotropically-shaped iron-based grain comprises an aspect ratio of between about 1.1 and about 50, and wherein the aspect ratio is defined as the ratio of the length of a longest dimension to the length of a shortest dimension of the anisotropic grain, where the longest dimension and shortest dimension are substantially orthogonal.

Clause 58: The workpiece of clause 57, wherein the at least one anisotropically-shaped iron-based grain defines a shortest dimension of between about 5 nm and about 300 nm.

Clause 59: The workpiece of clause 57 or 58, wherein the at least one anisotropically-shaped iron-based grain comprises a plurality of anisotropically-shaped iron-based grains, and wherein respective long axes of the plurality of anisotropically-shaped iron-based grains are oriented substantially parallel to each other.

Clause 60: The workpiece of any one of clauses 57 to 59, further comprising at least one iron-based phase domain including uniaxial magnetic anisotropy, wherein the longest dimension of the at least one anisotropically-shaped iron-based grain is substantially parallel to the direction of the uniaxial magnetic anisotropy.

Clause 61: The workpiece of any one of clauses 57 to 60, wherein the at least one anisotropically-shaped iron-based grain comprises iron-nitride.

Clause 62: The workpiece of claim 61, wherein the iron nitride comprises $\alpha''\text{-}Fe_{16}N_2$.

Clause 63: The workpiece of any one of clauses 57 to 60, wherein the at least one anisotropically-shaped iron-based grain comprises iron and at least one of C, B, O, P, Y, Mn, Co, Cr, Si, Zn, or Al.

Clause 64: The workpiece of any one of clauses 57 to 63, further comprising at least one dopant.

Clause 65: The workpiece of clause 64, wherein the at least one anisotropically-shaped iron-based grain comprises the dopant.

Clause 66: The workpiece of clause 64 or 65, wherein the at least one dopant comprises at least one of Al, Mn, La, Cr, Co, Ti, Ni, Zn, Zr, Ca, or a rare earth metal.

Clause 67: The workpiece of clause 64 or 65, wherein the at least one dopant comprises at least one of B, C, P, Si, or O.

Clause 68: The workpiece of any one of clauses 57 to 67, wherein, for each respective anisotropically-shaped iron-based grain, the respective easy axis of magnetocrystalline anisotropy is substantially parallel to the respective longest axis.

Clause 69: A bulk permanent magnet comprising: at least one anisotropically-shaped iron-based grain, wherein the at least one anisotropically-shaped iron-based grain comprises an aspect ratio of between about 1.1 and about 50, and wherein the aspect ratio is defined as the ratio of the length of a longest dimension to the length of a shortest dimension of the anisotropic grain, where the longest dimension and shortest dimension are substantially orthogonal.

Clause 70: The bulk permanent magnet of clause 69, wherein the at least one anisotropically-shaped iron-based grain defines a shortest dimension of between about 5 nm and about 300 nm.

Clause 71: The bulk permanent magnet of clause 69 or 70, wherein the at least one anisotropically-shaped iron-based grain comprises a plurality of anisotropically-shaped iron-based grains, and wherein respective long axes of the plurality of anisotropically-shaped iron-based grains are oriented substantially parallel to each other.

Clause 72: The bulk permanent magnet of any one of clauses 69 to 71, further comprising at least one iron-based phase domain including uniaxial magnetic anisotropy, wherein the longest dimension of the at least one anisotropically-shaped iron-based grain is substantially parallel to the direction of the uniaxial magnetic anisotropy.

Clause 73: The bulk permanent magnet of any one of clauses 69 to 72, wherein the at least one anisotropically-shaped iron-based grain comprises iron-nitride.

Clause 74: The bulk permanent magnet of clause 73, wherein the iron nitride comprises $\alpha''\text{-}Fe_{16}N_2$.

Clause 75: The bulk permanent magnet of any one of clauses 69 to 72, wherein the at least one anisotropically-shaped iron-based grain comprises iron and at least one of C, B, O, P, Y, Mn, Co, Cr, Si, Zn, or Al.

Clause 76: The bulk permanent magnet of any one of clauses 69 to 75, further comprising at least one dopant.

Clause 77: The bulk permanent magnet of clause 76, wherein the at least one anisotropically-shaped iron-based grain comprises the dopant.

Clause 78: The bulk permanent magnet of clause 76 or 77, wherein the at least one dopant comprises at least one of Al, Mn, La, Cr, Co, Ti, Ni, Zn, Zr, Ca, or a rare earth metal.

Clause 79: The bulk permanent magnet of clause 76 or 77, wherein the at least one dopant comprises at least one of B, C, P, Si, or O.

Clause 80: The bulk permanent magnet of any one of clauses 69 to 79, wherein, for each respective anisotropically-shaped iron-based grain, the respective easy axis of magnetocrystalline anisotropy is substantially parallel to the respective longest axis.

EXAMPLE

Figure 12:
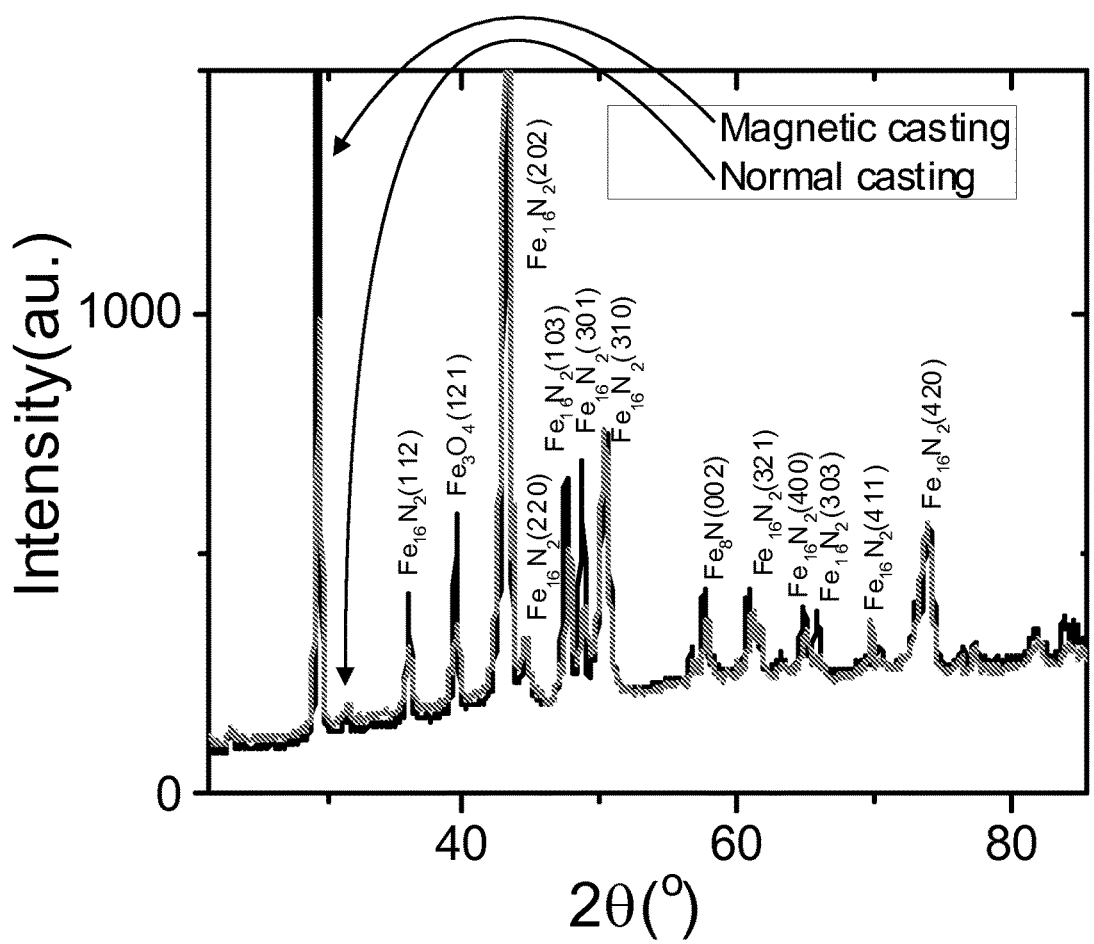
FIG. 12 illustrates example x-ray diffraction spectra from iron nitride material casted with and without application of an external magnetic field.

FIG. 12 illustrates example x-ray diffraction spectra from iron nitride material casted with and without application of an external magnetic field. The darker trace shows the phase composition when casted in the presence of a magnetic field. The lighter trace shows the phase composition when casted without application of a magnetic field. The nitrogen concentration in the samples was between about 5 at. % and about 8 at. % on average. The samples were heated at about 650° C. for about 4 hours with and without a 9 T magnetic field being applied. The samples were casted in ice water. The cooling rate was estimated to be about 200° C./second. Table 2 shows the variations in the peaks illustrated in FIG. 12 after magnetic casting.

TABLE 2

| | Peak Height | Peak Shift |
|---|---|---|
| $Fe_{16}N_2(112)$ | Increase | None |
| $Fe_{16}N_2(220)$ | Increase | Left |
| $Fe_{16}N_2(202)$ | None | None |
| $Fe_{16}N_2(103)$ | Increase | Left |
| $Fe_{16}N_2(301)$ | Increase | Left |
| $Fe_{16}N_2(310)$ | None | None |
| $Fe_8N(002)/Fe_{16}N_2(004)$ | Increase | Left |
| $Fe_{16}N_2(321)$ | Increase | Left |
| $Fe_{16}N_2(400)$ | Increase | Left |
| $Fe_{16}N_2(303)$ | Increase | Left |

Various examples have been described. These and other examples are within the scope of the following claims.

What is claimed is:

1. A method comprising:
casting a material including iron in the presence of an applied magnetic field to form a workpiece including at least one iron-based phase domain including uniaxial magnetic anisotropy and at least one anisotropically-shaped iron-based grain, wherein the applied magnetic field has a strength of at least about 0.01 Tesla (T), wherein the at least one iron-based phase domain comprises at least one $\alpha''\text{-}Fe_{16}N_2$ phase domain and wherein the material comprises at least one dopant wherein the at least one dopant comprises at least one of Al, Mn, La, Cr, Co, Ti, Ni, Zn, Zr, Ca, or a rare earth metal;
wherein the at least one anisotropically-shaped iron-based grain comprises an aspect ratio of between about 1.1 and about 50, and wherein aspect ratio is defined as the ratio of the length of a longest dimension to the length of a shortest dimension of the anisotropic grain, where the longest dimension and shortest dimension are substantially orthogonal.

2. The method of claim 1, wherein casting the material including iron comprises casting a material including iron and nitrogen in the presence of an applied magnetic field to form a workpiece including at least one iron-nitride phase domain.

3. The method of claim 2, wherein, prior to casting, the concentration of nitrogen in the material is between about 8 atomic percent (at. %) and about 9 at. %.

4. The method of claim 1, wherein casting the material including iron comprises casting a material including iron and at least one of C, B, O, P, Y, Mn, Co, Cr, Si, Zn, or Al in the presence of an applied magnetic field to form a workpiece including at least one phase domain having uniaxial magnetic anisotropy.

5. The method of claim 1, wherein the at least one anisotropically-shaped iron-based grain defines a shortest dimension of between about 5 nm and about 300 nm.

6. The method of claim 1, wherein the at least one anisotropically-shaped iron-based grain comprises a plurality of anisotropically-shaped iron-based grains, and wherein respective long axes of the plurality of anisotropically-shaped iron-based grains are oriented substantially parallel to each other.

7. The method of claim 1, wherein the respective long axes of the plurality of anisotropically-shaped iron-based grains are oriented substantially parallel to the direction of the applied magnetic field, and, wherein, for each respective anisotropically-shaped iron-based grain, the respective easy axis of magnetocrystalline anisotropy is substantially parallel to the respective longest axis.

8. The method of claim 1, wherein the strength of the applied magnetic field is greater than about 0.02 T.

9. The method of claim 1, wherein the strength of the applied magnetic field is greater than about 2.5 T.

10. The method of claim 1, wherein the strength of the applied magnetic field is greater than about 9 T.

11. The method of claim 1, wherein the applied magnetic field has a gradient between about 0.01 Tesla per meter and about 1000 Tesla per meter.

12. The method of claim 1, wherein casting comprises:
heating a mixture including iron to form a molten mixture including iron; and
cooling the molten mixture including iron to form the workpiece.

13. The method of claim 12, wherein cooling the molten mixture comprises quenching the molten mixture in at least one of water, ice water, brine, an oil, ammonia water, or an amide.

14. The method of claim 12, wherein cooling the molten mixture including iron comprises cooling the molten mixture including iron between cooled rollers to form the workpiece.

15. The method of claim 12, wherein heating the mixture including iron comprises heating the mixture including iron in the presence of the applied magnetic field, and wherein cooling the molten mixture including iron comprises cooling the molten mixture including iron in the presence of the applied magnetic field.

16. The method of claim 12, wherein heating the mixture including iron comprises heating the mixture including iron in a crucible using a radio frequency furnace.

17. The method of claim 12, wherein heating the mixture including iron comprises heating the mixture including iron in a cold crucible, and wherein the mixture is substantially enclosed within a cover material.

18. The method of claim 1, further comprising compacting a plurality of the workpieces to form a bulk material.

19. The method of claim 18, wherein compacting the plurality of the workpieces to form the bulk material comprises compacting the plurality of workpieces in the presence of an applied magnetic field to form a bulk material including a plurality of iron-based phase domains including uniaxial magnetic anisotropy, wherein the applied magnetic field has a strength of at least about 0.01 Tesla (T).

20. A method comprising:
casting a material including iron in the presence of an applied magnetic field to form a workpiece including at least one iron-based phase domain including uniaxial magnetic anisotropy, wherein the applied magnetic field has a strength of at least about 0.01 Tesla (T), wherein the at least one iron-based phase domain comprises at least one $\alpha''\text{-}Fe_{16}N_2$ phase domain and wherein the material comprises at least one dopant wherein the at least one dopant comprises at least one of Al, Mn, La, Cr, Co, Ti, Ni, Zn, Zr, Ca, or a rare earth metal;
wherein the applied magnetic field has a gradient between about 0.01 Tesla per meter and about 1000 Tesla per meter.

21. The method of claim 20, wherein the at least one anisotropically-shaped iron-based grain defines a shortest dimension of between about 5 nm and about 300 nm.

22. The method of claim 20, wherein the at least one anisotropically-shaped iron-based grain comprises a plurality of anisotropically-shaped iron-based grains, and wherein respective long axes of the plurality of anisotropically-shaped iron-based grains are oriented substantially parallel to each other.

23. The method of claim 20, wherein the strength of the applied magnetic field is greater than about 0.02 T.

24. A method comprising:
casting a material including iron in the presence of an applied magnetic field to form a workpiece including at least one iron-based phase domain including uniaxial magnetic anisotropy, wherein the applied magnetic field has a strength of at least about 0.01 Tesla (T), wherein the at least one iron-based phase domain comprises at least one $\alpha''\text{-Fe}_{16}\text{N}_2$ phase domain and wherein the material comprise at least one dopant wherein the at least one dopant comprises at least one of Al, Mn, La, Cr, Co, Ti, Ni, Zn, Zr, Ca, or a rare earth metal;
wherein casting comprises heating a mixture including iron to form a molten mixture including iron; and cooling the molten mixture including iron to form the workpiece
wherein cooling the molten mixture comprises quenching the molten mixture in at least one of water, ice water, brine, an oil, ammonia water, or an amide.

25. The method of claim 24, wherein the at least one anisotropically-shaped iron-based grain defines a shortest dimension of between about 5 nm and about 300 nm.

26. The method of claim 24, wherein the at least one anisotropically-shaped iron-based grain comprises a plurality of anisotropically-shaped iron-based grains, and wherein respective long axes of the plurality of anisotropically-shaped iron-based grains are oriented substantially parallel to each other.

27. The method of claim 24, wherein the strength of the applied magnetic field is greater than about 0.02 T.

28. A method comprising:
casting a material including iron in the presence of an applied magnetic field to form a workpiece including at least one iron-based phase domain including uniaxial magnetic anisotropy, wherein the applied magnetic field has a strength of at least about 0.01 Tesla (T), wherein the at least one iron-based phase domain comprises at least one $\alpha''\text{-Fe}_{16}\text{N}_2$ phase domain and wherein the material comprises at least one dopant wherein the at least one dopant comprises at least one of Al, Mn, La, Cr, Co, Ti, Ni, Zn, Zr, Ca, or a rare earth metal;
wherein casting comprises heating a mixture including iron to form a molten mixture including iron; and cooling the molten mixture including iron to form the workpiece
wherein heating the mixture including iron comprises heating the mixture including iron in a cold crucible, and wherein the mixture is substantially enclosed within a cover material.

29. The method of claim 28, wherein the at least one anisotropically-shaped iron-based grain defines a shortest dimension of between about 5 nm and about 300 nm.

30. The method of claim 28, wherein the at least one anisotropically-shaped iron-based grain comprises a plurality of anisotropically-shaped iron-based grains, and wherein respective long axes of the plurality of anisotropically-shaped iron-based grains are oriented substantially parallel to each other.

31. The method of claim 28, wherein the strength of the applied magnetic field is greater than about 0.02 T.

32. A workpiece formed by the method of claim 1.

* * * * *